US012633022B2

(12) United States Patent
Xu et al.

(10) Patent No.: US 12,633,022 B2
(45) Date of Patent: May 19, 2026

(54) SYSTEMS AND METHODS FOR MATERIAL DECOMPOSITION

(71) Applicant: WUHAN UNITED IMAGING LIFE SCIENCE INSTRUMENT CO., LTD., Hubei (CN)

(72) Inventors: Tan Xu, Wuhan (CN); Jinglu Ma, Shanghai (CN); Wenting Xu, Wuhan (CN)

(73) Assignee: WUHAN UNITED IMAGING LIFE SCIENCE INSTRUMENT CO., LTD., Wuhan (CN)

( * ) Notice: Subject to any disclaimer, the term of this patent is extended or adjusted under 35 U.S.C. 154(b) by 430 days.

(21) Appl. No.: 18/186,980

(22) Filed: Mar. 21, 2023

(65) Prior Publication Data

US 2023/0298233 A1  Sep. 21, 2023

(30) Foreign Application Priority Data

Mar. 21, 2022  (CN) .......................... 202210275383.8

(51) Int. Cl.
*G06T 11/00*  (2006.01)

(52) U.S. Cl.
CPC .......... *G06T 11/008* (2013.01); *G06T 11/005* (2013.01)

(58) Field of Classification Search
CPC combination set(s) only.
See application file for complete search history.

(56) References Cited

U.S. PATENT DOCUMENTS

| | | | | |
|---|---|---|---|---|
| 2013/0343624 A1* | 12/2013 | Thibault | ............... | G06T 11/006 |
| | | | | 382/131 |
| 2018/0235562 A1* | 8/2018 | Petschke | .............. | A61B 6/4241 |
| 2018/0300879 A1 | 10/2018 | Fu | | |
| 2019/0295249 A1 | 9/2019 | Schaefer et al. | | |
| 2022/0067988 A1 | 3/2022 | Schreiber | | |

FOREIGN PATENT DOCUMENTS

| | | | | |
|---|---|---|---|---|
| CN | 1640361 A | 7/2005 | | |
| DE | 102011084683 A1 * | 4/2013 | ............... | A61B 6/03 |

OTHER PUBLICATIONS

Wang, Xiaolan et al., Uniformity Correction in Photon-counting X-ray Detector Based on Basis Material Decomposition, 2008 IEEE Nuclear Science Symposium Conference Record, 4902-4905, 2008.
Keh-Shih Chuang et al., Comparison of Four Dual Energy Image Decomposition Methods, Physics in Medicine & Biology, 33(4): 455-466, 1988.

* cited by examiner

*Primary Examiner* — Vu Le
*Assistant Examiner* — Matthew James Bodnark
(74) *Attorney, Agent, or Firm* — METIS IP LLC

(57) ABSTRACT

The present disclosure provides systems and methods for material decomposition. The systems may obtain scan projection data of a target object. The systems may determine corrected projection data by correcting, based on one or more pixel parameters, the scan projection data. The systems may also determine a reconstructed image by performing, based on the corrected projection data, image reconstruction. The systems may further determine density distribution images of at least two target materials of the target object by decomposing the reconstructed image.

20 Claims, 8 Drawing Sheets

<u>500</u>

600

<u>800</u>

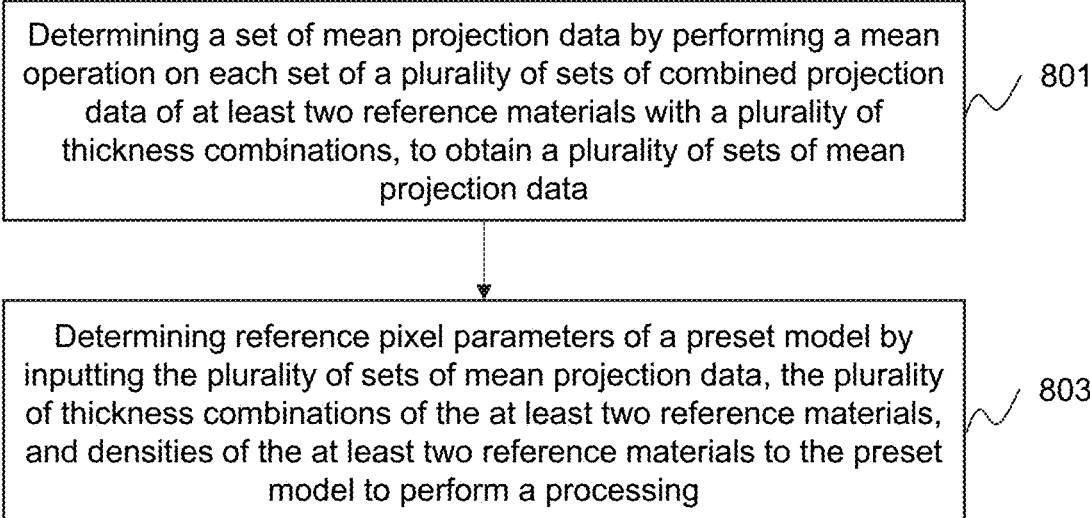

Determining a set of mean projection data by performing a mean operation on each set of a plurality of sets of combined projection data of at least two reference materials with a plurality of thickness combinations, to obtain a plurality of sets of mean projection data — 801

Determining reference pixel parameters of a preset model by inputting the plurality of sets of mean projection data, the plurality of thickness combinations of the at least two reference materials, and densities of the at least two reference materials to the preset model to perform a processing — 803

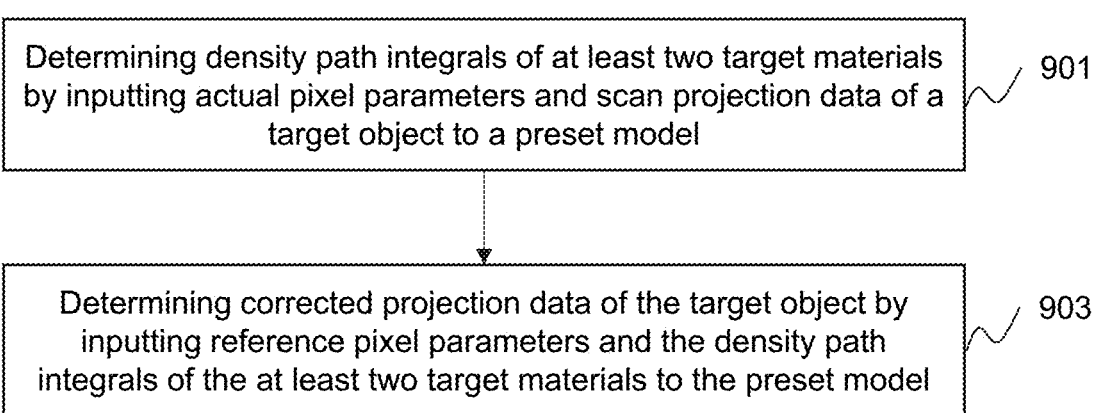

Determining density path integrals of at least two target materials by inputting actual pixel parameters and scan projection data of a target object to a preset model — 901

Determining corrected projection data of the target object by inputting reference pixel parameters and the density path integrals of the at least two target materials to the preset model — 903

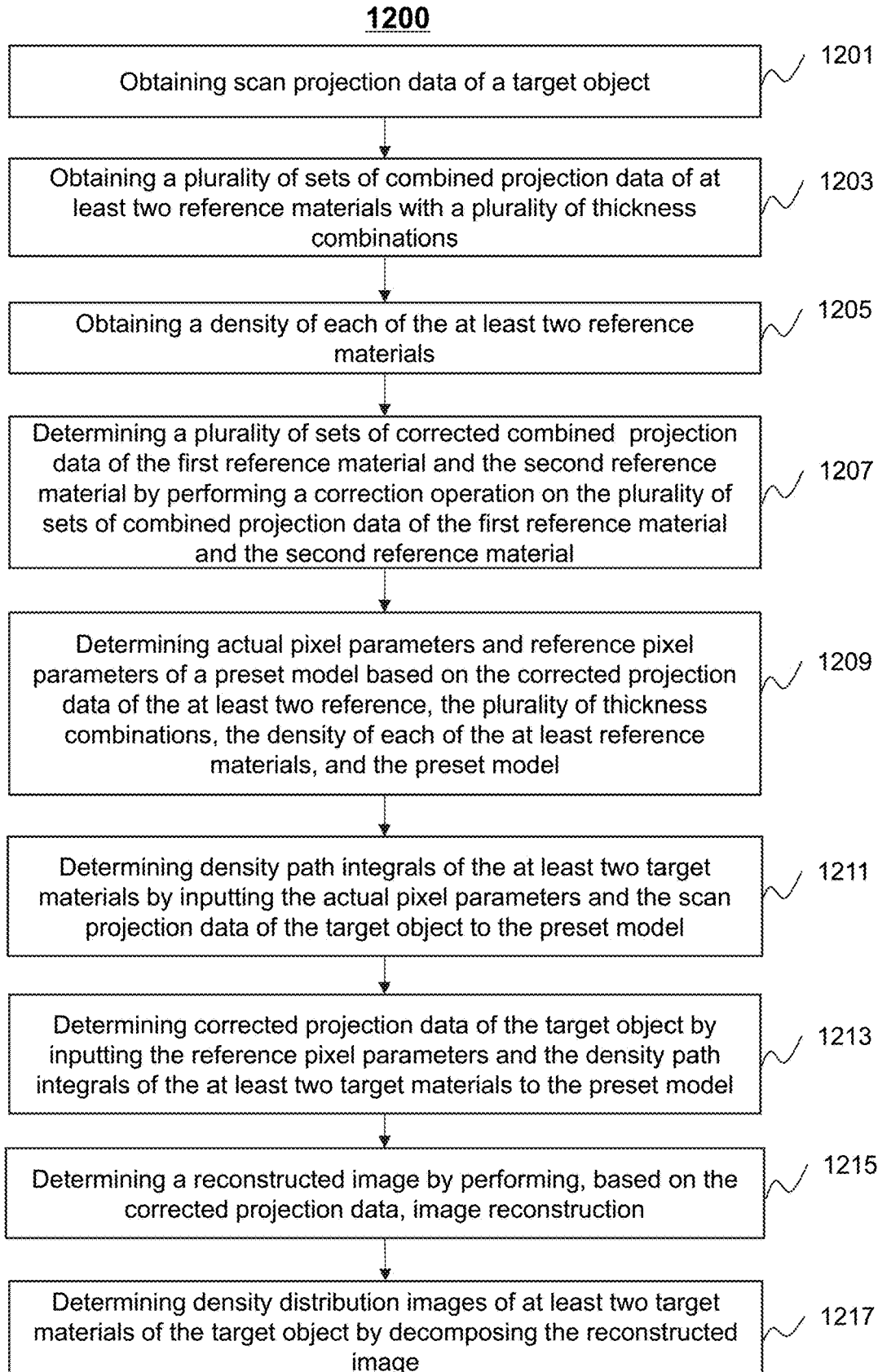

Obtaining scan projection data of a target object — 1201

Obtaining a plurality of sets of combined projection data of at least two reference materials with a plurality of thickness combinations — 1203

Obtaining a density of each of the at least two reference materials — 1205

Determining a plurality of sets of corrected combined projection data of the first reference material and the second reference material by performing a correction operation on the plurality of sets of combined projection data of the first reference material and the second reference material — 1207

Determining actual pixel parameters and reference pixel parameters of a preset model based on the corrected projection data of the at least two reference, the plurality of thickness combinations, the density of each of the at least reference materials, and the preset model — 1209

Determining density path integrals of the at least two target materials by inputting the actual pixel parameters and the scan projection data of the target object to the preset model — 1211

Determining corrected projection data of the target object by inputting the reference pixel parameters and the density path integrals of the at least two target materials to the preset model — 1213

Determining a reconstructed image by performing, based on the corrected projection data, image reconstruction — 1215

Determining density distribution images of at least two target materials of the target object by decomposing the reconstructed image — 1217

FIG. 12

SYSTEMS AND METHODS FOR MATERIAL DECOMPOSITION

CROSS-REFERENCE TO RELATED APPLICATIONS

This application claims priority of Chinese Application No. 202210275383.8, filed on Mar. 21, 2022, the contents of which are hereby incorporated by reference.

TECHNICAL FIELD

The present disclosure generally relates to the field of computing technology, and more particularly, relates to systems and methods for material decomposition.

BACKGROUND

The development of computer tomography (CT) technology depends on the iteration and upgrade of the important components of the CT system. As the three important components of the CT system, a radiation tube, a high voltage generator, and a detector have experienced decades of optimization and breakthrough. The major innovation of detector technology, especially the appearance of the photon counting detector, is expected to bring traditional CT into the world of energy spectrum CT. One of the important technical cornerstones of the energy spectrum CT is material decomposition. The material decomposition mainly refers to expressing attenuation information of an object to be detected using a combination of two or more materials with known attenuation characteristics. Energy spectrum images can be obtained by post-processing images of the decomposed materials. The energy spectrum images have better image quality and fewer metal artifacts and can reduce scanning times and dose accumulation.

Therefore, it is desirable to provide effective systems and methods for material decomposition, thereby improving the accuracy of images of decomposed materials.

SUMMARY

In a first aspect of the present disclosure, a system is provided. The system may include a storage device storing a set of instructions, and at least one processor in communication with the storage device. When executing the set of instructions, the at least one processor may be configured to cause the system to perform following operations. The system may obtain scan projection data of a target object. The system may determine corrected projection data by correcting, based on one or more pixel parameters, the scan projection data. The system may determine a reconstructed image by performing, based on the corrected projection data, image reconstruction. The system may determine density distribution images of at least two target materials of the target object by decomposing the reconstructed image.

In some embodiments, the one or more pixel parameters may be determined by performing a model calibration on at least two reference materials. The at least two reference materials may correspond to the at least two target materials.

In some embodiments, each of the at least two reference materials and a corresponding one of the at least two target materials may have substantially consistent attenuation characteristics.

In some embodiments, the at least two reference materials may be configured as material flat plates, and the material flat plates may be positioned such that a normal vector of each of the material flat plates has a consistent direction with an isocentric ray of a radiation source.

In some embodiments, the model calibration may include determining actual pixel parameters and reference pixel parameters of a preset model based on projection data of the at least two reference materials and the preset model.

In some embodiments, the projection data of the at least two reference materials may include a plurality of sets of combined projection data of the at least two reference materials with a plurality of thickness combinations, and to determine the actual pixel parameters and the reference pixel parameters of the preset model based on the projection data of the at least two reference materials and the preset model, the at least one processor may be configured to cause the system to obtain a density of each of the at least two reference materials; and determine the actual pixel parameters and the reference pixel parameters by processing initial pixel parameters of the preset model based on the plurality of sets of combined projection data, the plurality of thickness combinations of the at least two reference materials, and the densities of the at least two reference materials.

In some embodiments, to determine the reference pixel parameters, the at least one processor is configured to cause the system to determine a set of mean projection data by performing a mean operation on each set of the plurality of sets of combined projection data, to obtain a plurality of sets of mean projection data; determine the reference parameters of the preset model by inputting the plurality of sets of mean projection data, the plurality of thickness combinations of the at least two reference materials, and the densities of the at least two reference materials to the preset model to perform the processing.

In some embodiments, the at least one processor may be further configured to cause the system to determine a set of corrected combined projection data by performing a correction operation on each set of the plurality of sets of combined projection data of the at least two reference materials with one of the plurality of thickness combinations.

In some embodiments, the correction operation may include a cosine correction.

In some embodiments, the preset model may be configured to represent a correlation relationship between projected data of the at least two reference materials, the actual pixel parameters and the reference pixel parameters, and the at least two reference materials.

In some embodiments, the one or more pixel parameters may include actual pixel parameters and reference pixel parameters of a preset model. To determine the corrected projection data, the at least one processor may be configured to cause the system to determine density path integrals of the at least two target materials by inputting the actual pixel parameters and the scan projection data to the preset model; and determine the corrected projection data by inputting the reference pixel parameters and the density path integrals of the at least two target materials to the preset model.

In some embodiments, the one or more pixel parameters may be determined based on one or more scanning parameters relating to generation of the scan projection data.

In a second aspect of the present disclosure, a system is provided. The system may include a storage device storing a set of instructions, at least one processor in communication with the storage device. When executing the set of instructions, the at least one processor may be configured to cause the system to obtain projection data of at least two reference materials; and determine, based at least on the projection data of the at least two reference materials, one or more pixel parameters of a preset model for correcting scan projection data of a target object. The preset model may represent a correlation relationship between the projected data of the at least two reference materials, the one or more pixel parameters, and the at least two reference materials. The target object may include at least two target materials corresponding to the at least two reference materials.

In some embodiments, the one or more pixel parameters may include actual pixel parameters and reference pixel parameters of the preset model.

In some embodiments, the projection data of the at least two reference materials may include a plurality of sets of combined projection data of the at least two reference materials with a plurality of thickness combinations. To determine, based at least on the projection data of the at least two reference materials, one or more pixel parameters of a preset model for correcting scan projection data of a target object, the at least one processor is configured to cause the system to obtain a density of each of the at least two reference materials; and determine the actual pixel parameters and the reference pixel parameters by processing initial pixel parameters of the preset model based on the plurality of sets of combined projection data, the plurality of thickness combinations of the at least two reference materials, and the densities of the at least two reference materials.

In some embodiments, to determine the reference pixel parameters, the at least one processor is configured to cause the system to determine a set of mean projection data by performing a mean operation on each set of the plurality of sets of combined projection data, to obtain a plurality of sets of mean projection data; determine the reference parameters of the preset model by inputting the plurality of sets of mean projection data, the plurality of thickness combinations of the at least two reference materials, and the densities of the at least two reference materials to the preset model to perform the processing.

In some embodiments, the at least one processor may be configured to cause the system to determine a set of corrected combined projection data by performing a correction operation on each set of the plurality of sets of combined projection data of the at least two reference materials with one of the plurality of thickness combinations.

In some embodiments, each of the at least two reference materials and a corresponding one of the at least two target materials may have substantially consistent attenuation characteristics.

In some embodiments, the at least two reference materials may be configured as material flat plates, and the material flat plates may be positioned such that a normal vector of each of the material flat plates has a consistent direction with an isocentric ray of a radiation source.

In a third aspect of the present disclosure, a method implemented on a computing device is provided. The method may include obtaining scan projection data of a target object; determining corrected projection data by correcting, based on one or more pixel parameters, the scan projection data; determining a reconstructed image by performing, based on the corrected projection data, image reconstruction; and determining density distribution images of at least two target materials of the target object by decomposing the reconstructed image.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities, and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. The drawings are not to scale. These embodiments are non-limiting exemplary embodiments, in which like reference numerals represent similar structures throughout the several views of the drawings, and wherein:

FIG. 8 is a flowchart illustrating an exemplary process for determining reference pixel parameters according to some embodiments of the present disclosure;

FIG. 9 is a flowchart illustrating an exemplary process for projection data correction according to some embodiments of the present disclosure;

FIG. 12 is a schematic diagram illustrating an exemplary process for material decomposition according to some embodiments of the present disclosure.

DETAILED DESCRIPTION

In the following detailed description, numerous specific details are set forth by way of examples in order to provide a thorough understanding of the relevant disclosure. However, it should be apparent to those skilled in the art that the present disclosure may be practiced without such details. In other instances, well-known methods, procedures, systems, components, and/or circuitry have been described at a relatively high-level, without detail, in order to avoid unnecessarily obscuring aspects of the present disclosure. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but to be accorded the widest scope consistent with the claims.

The terminology used herein is for the purpose of describing particular example embodiments only and is not intended to be limiting. As used herein, the singular forms "a," "an," and "the" may be intended to include the plural forms as well, unless the context clearly indicates otherwise. It will be further understood that the terms "comprise," "comprises," and/or "comprising," "include," "includes," and/or "including," when used in this specification, specify the presence of stated features, integers, steps, operations, elements, and/or components, but do not preclude the presence or addition of one or more other features, integers, steps, operations, elements, components, and/or groups thereof.

It will be understood that the term "system," "engine," "unit," "module," and/or "block" used herein are one method to distinguish different components, elements, parts, sections or assembly of different levels in descending order. However, the terms may be displaced by another expression if they achieve the same purpose.

Figure 2:
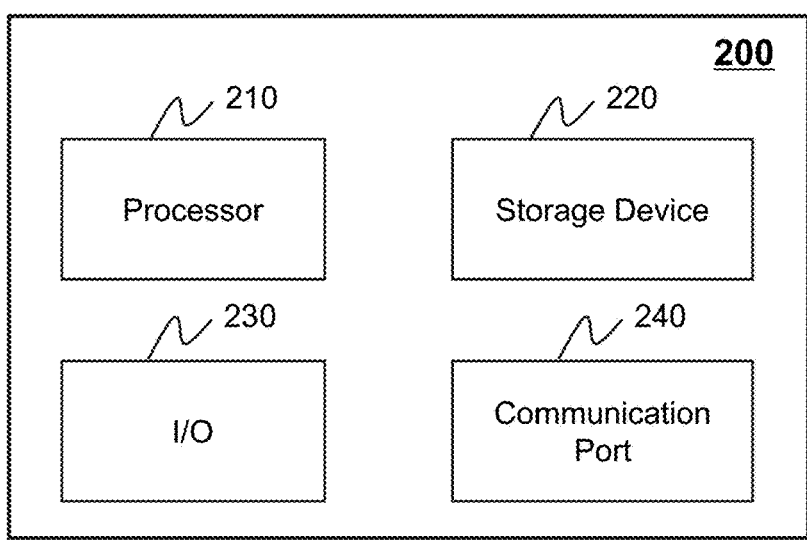
FIG. 2 is a schematic diagram illustrating hardware and/or software components of an exemplary computing device according to some embodiments of the present disclosure.

Generally, the word "module," "unit," or "block," as used herein, refers to logic embodied in hardware or firmware, or to a collection of software instructions. A module, a unit, or a block described herein may be implemented as software and/or hardware and may be stored in any type of non-transitory computer-readable medium or another storage device. In some embodiments, a software module/unit/block may be compiled and linked into an executable program. It will be appreciated that software modules can be callable from other modules/units/blocks or from themselves, and/or may be invoked in response to detected events or interrupts. Software modules/units/blocks configured for execution on computing devices (e.g., processor 210 as illustrated in FIG. 2) may be provided on a computer-readable medium, such as a compact disc, a digital video disc, a flash drive, a magnetic disc, or any other tangible medium, or as a digital download (and can be originally stored in a compressed or installable format that needs installation, decompression, or decryption prior to execution). Such software code may be stored, partially or fully, on a storage device of the executing computing device, for execution by the computing device. Software instructions may be embedded in firmware, such as an EPROM. It will be further appreciated that hardware modules/units/blocks may be included in connected logic components, such as gates and flip-flops, and/or can be included of programmable units, such as programmable gate arrays or processors. The modules/units/blocks or computing device functionality described herein may be implemented as software modules/units/blocks, but may be represented in hardware or firmware. In general, the modules/units/blocks described herein refer to logical modules/units/blocks that may be combined with other modules/units/blocks or divided into sub-modules/sub-units/sub-blocks despite their physical organization or storage. The description may be applicable to a system, an engine, or a portion thereof.

It will be understood that when a unit, engine, module or block is referred to as being "on," "connected to," or "coupled to," another unit, engine, module, or block, it may be directly on, connected or coupled to, or communicate with the other unit, engine, module, or block, or an intervening unit, engine, module, or block may be present, unless the context clearly indicates otherwise. As used herein, the term "and/or" includes any and all combinations of one or more of the associated listed items. The term "image data" in the present disclosure is used to collectively refer to raw data (e.g., projection data) and/or images of various forms, including two-dimensional (2D) image data, three-dimensional (3D) image data, four-dimensional (4D) image data, etc. The terms "pixel" in the present disclosure are used to refer to an element of an image. The subject may include a biological subject (e.g., a human, an animal), a non-biological subject (e.g., a phantom), etc. For example, the subject may include a specific part, organ, and/or tissue of a patient. As another example, the subject may include the head, the brain, the neck, the breast, the heart, the lung, the stomach, blood vessels, soft tissues, or the like, or any combination thereof. The term "object" or "subject" are used interchangeably in the present disclosure. The term "modality" used herein broadly refers to an imaging or treatment method or technology that gathers, generates, processes, and/or analyzes imaging information of a subject or treatments the subject. The terms "plurality of" in the present disclosure may refer to that a count (number) of a related object is more than two (i.e., at least two).

In the present disclosure, a representation of an object (e.g., a patient, a subject, or a portion thereof) in an image may be referred to as an "object" for brevity. For instance, a representation of an organ or tissue (e.g., a heart, a liver, a lung) in an image may be referred to as an organ or tissue for brevity. Further, an image including a representation of an object may be referred to as an image of an object or an image including an object for brevity. Still further, an operation performed on a representation of an object in an image may be referred to as an operation performed on an object for brevity. For instance, a segmentation of a portion of an image including a representation of an organ or tissue from the image may be referred to as a segmentation of an organ or tissue for brevity.

These and other features, and characteristics of the present disclosure, as well as the methods of operation and functions of the related elements of structure and the combination of parts and economies of manufacture, may become more apparent upon consideration of the following description with reference to the accompanying drawings, all of which form a part of this disclosure. It is to be expressly understood, however, that the drawings are for the purpose of illustration and description only and are not intended to limit the scope of the present disclosure. It is understood that the drawings are not to scale.

The flowcharts used in the present disclosure illustrate operations that systems implement according to some embodiments of the present disclosure. It is to be expressly understood the operations of the flowcharts may be implemented not in order. Conversely, the operations may be implemented in an inverted order, or simultaneously. Moreover, one or more other operations may be added to the flowcharts. One or more operations may be removed from the flowcharts.

In related technologies, material decomposition is generally achieved using a material decomposition algorithm in projection domain. During the decomposition process, an emission spectrum curve of a radiation tube and an energy response curve of a detector need to be obtained, and then images (e.g., density distribution images) of multiple decomposed materials are obtained by processing the emission spectrum curve of the radiation tube and the energy response curves of the detector. However, in the actual process, it is difficult to obtain the emission spectrum curve of the radiation tube and the energy response curve of the detector. In other words, the obtained emission spectrum curve of the radiation tube and energy response curves of the detector generally lack accuracy, thereby resulting in the inaccuracy of the images of decomposed materials determined based on material decomposition.

An aspect of the present disclosure provides systems and methods for material decomposition is provided. The system may obtain scan projection data of a target object. The system may determine a density distribution image of at least two target materials of the target object based on one or more pixel parameters and the scan projection data. For example, the system may determine corrected projection data by correcting, based on the one or more pixel parameters, the scan projection data. The system may determine a reconstructed image by performing, based on the corrected projection data, image reconstruction. The system may determine the density distribution images of the at least two target materials of the target object by decomposing the reconstructed image. As used herein, a target material may refer to a basis material in the target object, such as water, calcium, lipid (or fat), of the target object.

According to some embodiments of the present disclosure, the system may determine actual pixel parameters and reference pixel parameters of a preset model based on pixel data of the at least two materials and the preset model. The system may correct the scan projection data of the target object based on the actual pixel parameters and the reference pixel parameters for generating the reconstructed image. Further, the system may decompose the reconstructed image using a decomposition algorithm in image domain to determine images (e.g., the density distribution images) the of the at least two target materials. According to the process described above, there is no need to obtain the emission spectrum curve of the radiation tube and the energy response curves of the detector for the material decomposition, and the scan projection data of the target object is corrected based on reference materials corresponding to the at least two target materials and the actual pixel parameters and the reference pixel materials of the preset model. As used herein, a reference material refers to a material (e.g., an organic or inorganic material) that has equivalent or substantially consistent attenuation characteristic(s) with a corresponding target material. In such cases, the obtained projection data of the target object can be relatively accurate, and the images of the at least two target materials determined by image reconstruction and material decomposition based on the accurate projection data can be more accurate. That is, the data source of material decomposition is more accurate, accordingly, the decomposition result is more accurate, i.e., the accuracy of the images of the at least two target materials is improved.

Figure 1:
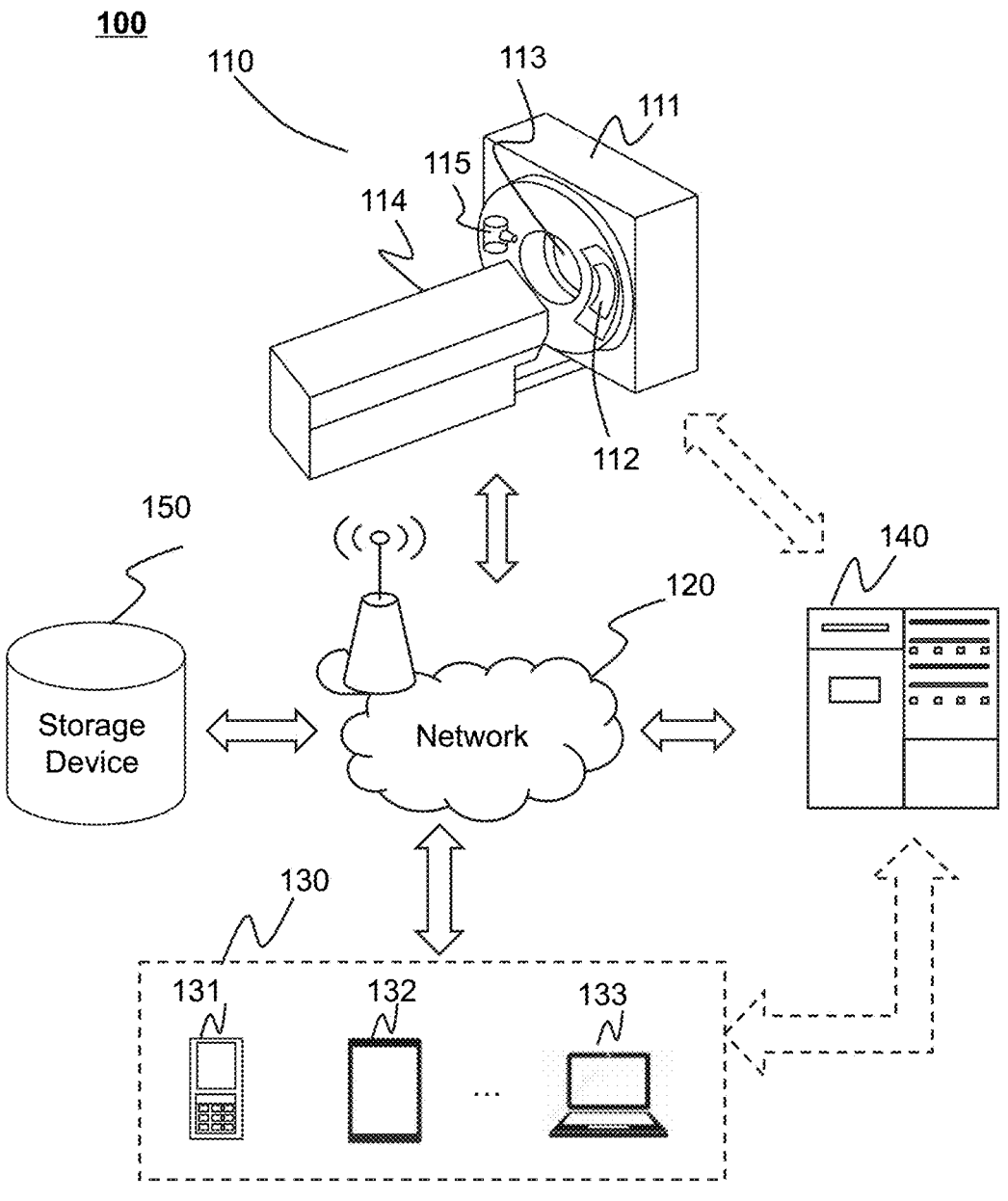
FIG. 1 is a schematic diagram illustrating an exemplary imaging system according to some embodiments of the present disclosure.

FIG. 1 is a schematic diagram illustrating an exemplary imaging system according to some embodiments of the present disclosure. In some embodiments, the imaging system 100 may be configured to achieve material decomposition and/or image reconstruction. In some embodiments, the medical imaging system may include a single modality system and/or a multi-modality system. The single modality system may include a multi-energy computed tomography (CT) system (e.g., a dual-energy CT device). For brevity, the term "multi-energy CT" may also be referred to as "CT" in the present disclosure. The multi-modality system may include a positron emission tomography-computed tomography (PET-CT) system, a digital subtraction angiography-computed tomography (CT-DSA) system, a computed tomography guided radiotherapy (CT guided RT) system, or the like, or any combination thereof. For illustration purposes, the medical imaging system 100 illustrated in FIG. 1 is provided with reference to a multi-energy CT system, which is not intended to limit the scope of the present disclosure.

As illustrated in FIG. 1, the imaging system 100 may include a scanner 110, the network 120, terminal(s) 130, a processing device 140, and a storage device 150. In some embodiments, two or more components of the imaging system 100 may be connected to and/or communicate with each other via a wireless connection, a wired connection, or a combination thereof. The connection among the components of the imaging system 100 may be variable. Merely by way of example, the scanner 110 may be connected to the processing device 140 through the network 120 or directly. As another example, the storage device 150 may be connected to the processing device 140 through the network 120 or directly.

The scanner 110 may be configured to scan a subject (e.g., a target object) or a portion thereof that is located within its detection region and generate scan projection data relating to the subject or a portion thereof. In some embodiments, the subject may include a biological subject (e.g., a patient) or a non-biological subject (e.g., a phantom). For example, the subject may include a specific part, organ, and/or tissue of a patient. As another example, the subject may include the head, the brain, the neck, the breast, the heart, the lung, the stomach, blood vessels, soft tissues, or the like, or any combination thereof. The term "object" or "subject" are used interchangeably in the present disclosure.

As illustrated, the CT device 110 may include a gantry 111, a detector 112, a detecting region 113, a table 114, and a radiation source 115. The gantry 111 may support the detector 112 and the radiation source 115. The gantry 111 may rotate, for example, clockwise or counterclockwise about an axis of rotation of the gantry 111. The radiation source 115 and/or the detector 112 may rotate together with the gantry 111. The subject may be placed on the table 114 and move together with the table 114 during a scan of the subject. The radiation source 115 may include a radiation tube. The radiation tube may be applied with a tube voltage (e.g., of a specific kilo volt (kV)) to generate a tube current for emitting a radiation beam (e.g., an X-ray beam) with a specific energy level. The specific energy level may correspond to a specific tube voltage and a specific tube current. Different tube voltages may correspond to different energy levels. The tube voltage of the radiation source 115 may be switched, and the energy level of the radiation beam emitted by the radiation source 115 may switch accordingly. The detector 112 (e.g., a photon-counting detector) may detect the radiation beam emitted from the radiation source 115. The detector 112 may include one or more detector units. For example, the detector 112 may include two energy bins for acquiring projection data corresponding to two energy levels (e.g., a relatively high energy level and a relatively low energy level).

The network 120 may include any suitable network that can facilitate the exchange of information and/or data of the imaging system 100. In some embodiments, one or more components of the imaging system 100 (e.g., the scanner 110, the terminal 130, the processing device 140, the storage device 150, etc.) may communicate information and/or data with other components of the imaging system 100 via the network 120. The network 120 may include a public network (e.g., the Internet), a private network (e.g., a local area network (LAN), a wide area network (WAN)), etc.), a wired network (e.g., an Ethernet network), a wireless network (e.g., an 802.11 network, a Wi-Fi network, etc.), a cellular network (e.g., a Long Term Evolution (LTE) network), a frame relay network, a virtual private network ("VPN"), a satellite network, a telephone network, routers, hubs, server computers, or the like, or a combination thereof. For example, the network 120 may include a wireline network, an optical fiber network, a telecommunication network, a local area network, a wireless local area network (WLAN), a metropolitan area network (MAN), a public telephone switched network (PSTN), a Bluetooth™ network, a Zig-Bee™ network, a near field communication (NFC) network, or the like, or a combination thereof. In some embodiments, the network 120 may include one or more network access points. For example, the network 120 may include wired and/or wireless network access points, such as base stations and/or Internet exchange points, through which one or more components of the imaging system 100 may be connected to the network 120 to exchange data and/or information.

The terminal 130 may input/output signals, data, information, etc. In some embodiments, the terminal 130 may enable a user interaction with the processing device 140. For example, the terminal 130 may display image(s) relating to the target object (e.g., a reconstructed image of the target object, density distribution images of at least two target materials of the target object, etc.) on a screen thereof. As another example, the terminal 130 may obtain a user's input information through an input device (e.g., a keyboard, a touch screen, a brain wave monitoring device), and transmit the input information to the processing device 140 for further processing. The terminal 130 may include a mobile device 131, a tablet computer 132, a laptop computer 133, or the like, or any combination thereof. In some embodiments, the mobile device 131 may include a smart home device, a wearable device, a mobile device, a virtual reality device, an augmented reality device, or the like, or any combination thereof. In some embodiments, the smart home device may include a smart lighting device, a control device of an intelligent electrical apparatus, a smart monitoring device, a smart television, a smart video camera, an interphone, or the like, or any combination thereof. In some embodiments, the wearable device may include a bracelet, footwear, a pair of glasses, a helmet, a watch, clothing, a backpack, a smart accessory, or the like, or any combination thereof. In some embodiments, the mobile device may include a mobile phone, a personal digital assistant (PDA), a navigation device, a point of sale (POS) device, a laptop computer, a tablet computer, a desktop computer, or the like, or any combination thereof. In some embodiments, the virtual reality device and/or augmented reality device may include a virtual reality helmet, a pair of virtual reality glasses, a virtual reality patch, an augmented reality helmet, a pair of augmented reality glasses, an augmented reality patch, or the like, or any combination thereof. For example, the virtual reality device and/or augmented reality device may include a Google Glass™, an Oculus Rift™, a Holo-Lens™, a Gear VR™, or the like. In some embodiments, the terminal 130 may be part of the processing device 140. In some embodiments, the terminal 130 may be integrated with the processing device 140 as an operation station of the scanner 110. Merely by way of example, a user/operator (for example, a doctor) of the imaging system 100 may control an operation of the scanner 110 through the operation station.

The processing device 140 may process data and/or information. The data and/or information may be obtained from the scanner 110, the terminal(s) 130, and/or the storage device 150. For example, the processing device 140 may obtain scan projection data of the target object (e.g., scan projection data obtained from the scanner 110). As another example, the processing device 140 may determine the density distribution images of the at least two target materials of the target object based on one or more pixel parameters and the scan projection data. In some embodiments, the processing device 140 may be a single server or a server group. The server group may be centralized or distributed. In some embodiments, the processing device 140 may be local or remote. For example, the processing device 140 may access information and/or data stored in the scanner 110, the terminal(s) 130, and/or the storage device 150 via the network 120. As another example, the processing device 140 may be directly connected to the scanner 110, the terminal(s) 130, and/or the storage device 150 to access stored information and/or data. In some embodiments, the processing device 140 may be implemented on a cloud platform. For example, a cloud platform may include a private cloud, a public cloud, a hybrid cloud, a community cloud, a distributed cloud, an inter-cloud, and a multi-cloud, or the like, or any combination thereof. In some embodiments, the processing device 140 may be implemented by a computing device 200 having one or more components as illustrated in FIG. 2.

The storage device 150 may store data (e.g., scan projection data and/or image(s) of the subject, etc.), instructions, and/or any other information. In some embodiments, the storage device 150 may store data obtained from the scanner 110, the terminal(s) 130 and/or the processing device 140. For example, the storage device 150 may store the scan projection data of the target object that is obtained from the scanner 110. In some embodiments, the storage device 150 may store data and/or instructions executed or used by the processing device 140 to perform exemplary methods described in the present disclosure. In some embodiments, the storage device 150 may include a mass storage, a removable storage, a volatile read-write memory, a read-only memory (ROM), or the like, or any combination thereof. For example, the mass storage may include a magnetic disk, an optical disk, a solid-state drives, a mobile storage, etc. The removable storage may include a flash drive, a floppy disk, an optical disk, a memory card, a ZIP disk, a magnetic tape, etc. The volatile read-and-write memory may include a random access memory (RAM). The RAM may include a dynamic RAM (DRAM), a double date rate synchronous dynamic RAM (DDR-SDRAM), a static RAM (SRAM), a thyristor RAM (T-RAM), and a zero-capacitor RAM (Z-RAM), etc. The ROM may include a mask ROM (MROM), a programmable ROM (PROM), an erasable programmable ROM (EPROM), an electrically erasable programmable ROM (EEPROM), a compact disk ROM (CD-ROM), a digital versatile disk ROM, etc. In some embodiments, the storage device 150 may be implemented by the cloud platform described in the present disclosure. For example, a cloud platform may include a private cloud, a public cloud, a hybrid cloud, a community cloud, a distributed cloud, an inter-clouds, a multi-cloud, or the like, or any combination thereof.

In some embodiments, the storage device 150 may be connected to the network 120 to communicate with one or more components (e.g., the processing device 140, the terminal 130, etc.) of the imaging system 100. One or more components of the imaging system 100 may access the data or instructions in the storage device 150 via the network 120. In some embodiments, the storage device 150 may be a part of the processing device 140 or may be independent and directly or indirectly connected to the processing device 140.

It should be noted that the above description regarding the imaging system 100 is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. In some embodiments, the imaging system 100 may include one or more additional components and/or one or more components of the imaging system 100 described above may be omitted. In some embodiments, a component of the imaging system 100 may be implemented on two or more sub-components. Two or more components of the imaging system 100 may be integrated into a single component.

FIG. 2 is a schematic diagram illustrating exemplary hardware and/or software components of an exemplary computing device according to some embodiments of the present disclosure. The computing device 200 may be configured to implement any component of the imaging system 100. For example, the terminal 130, the processing device 140, and/or the storage device 150 may be implemented on the computing device 200. Although only one such computing device is shown for convenience, the computer functions relating to the imaging system 100 as described herein may be implemented in a distributed fashion on a number of similar platforms, to distribute the processing load. As illustrated in FIG. 2, the computing device 200 may include a processor 210, a storage device 220, an input/output (I/O) 230, and a communication port 240.

The processor 210 may execute computer instructions (e.g., program codes) and perform functions of the processing device 140 in accordance with techniques described herein. The computer instructions may include, for example, routines, programs, objects, components, signals, data structures, procedures, modules, and functions, which perform particular functions described herein. In some embodiments, the processor 210 may perform instructions obtained from the terminal 130 and/or the storage device 150. In some embodiments, the processor 210 may include one or more hardware processors, such as a microcontroller, a microprocessor, a reduced instruction set computer (RISC), an application-specific integrated circuits (ASICs), an application-specific instruction-set processor (ASIP), a central processing unit (CPU), a graphics processing unit (GPU), a physics processing unit (PPU), a microcontroller unit, a digital signal processor (DSP), a field-programmable gate array (FPGA), an advanced RISC machine (ARM), a programmable logic device (PLD), any circuit or processor capable of executing one or more functions, or the like, or any combinations thereof.

Merely for illustration, only one processor is described in the computing device 200. However, it should be noted that the computing device 200 in the present disclosure may also include multiple processors. Thus operations and/or method steps that are performed by one processor as described in the present disclosure may also be jointly or separately performed by the multiple processors. For example, if in the present disclosure the processor of the computing device 200 executes both operation A and operation B, it should be understood that operation A and operation B may also be performed by two or more different processors jointly or separately in the computing device 200 (e.g., a first processor executes operation A and a second processor executes operation B, or the first and second processors jointly execute operations A and B).

The storage device 220 may store data/information obtained from the scanner 110, the terminal 130, the storage device 150, or any other component of the imaging system 100. In some embodiments, the storage device 220 may include a mass storage device, a removable storage device, a volatile read-and-write memory, a read-only memory (ROM), or the like, or any combination thereof. In some embodiments, the storage device 220 may store one or more programs and/or instructions to perform exemplary methods described in the present disclosure.

The I/O 230 may input or output signals, data, and/or information. In some embodiments, the I/O 230 may enable user interaction with the processing device 140. In some embodiments, the I/O 230 may include an input device and an output device. Exemplary input devices may include a keyboard, a mouse, a touch screen, a microphone, a camera capturing gestures, or the like, or a combination thereof. Exemplary output devices may include a display device, a loudspeaker, a printer, a projector, a 3D hologram, a light, a warning light, or the like, or a combination thereof. Exemplary display devices may include a liquid crystal display (LCD), a light-emitting diode (LED)-based display, a flat panel display, a curved screen, a television device, a cathode ray tube (CRT), or the like, or a combination thereof.

The communication port 240 may be connected with a network (e.g., the network 120) to facilitate data communications. The communication port 240 may establish connections between the processing device 140 and the scanner 110, the terminal 130, or the storage device 150. The connection may be a wired connection, a wireless connection, or a combination of both that enables data transmission and reception. The wired connection may include an electrical cable, an optical cable, a telephone wire, or the like, or any combination thereof. The wireless connection may include a Bluetooth network, a Wi-Fi network, a WiMax network, a WLAN, a ZigBee network, a mobile network (e.g., 3G, 4G, 5G), or the like, or any combination thereof. In some embodiments, the communication port 240 may be a standardized communication port, such as RS232, RS485, etc. In some embodiments, the communication port 240 may be a specially designed communication port. For example, the communication port 240 may be designed in accordance with the digital imaging and communications in medicine (DICOM) protocol.

Figure 3:
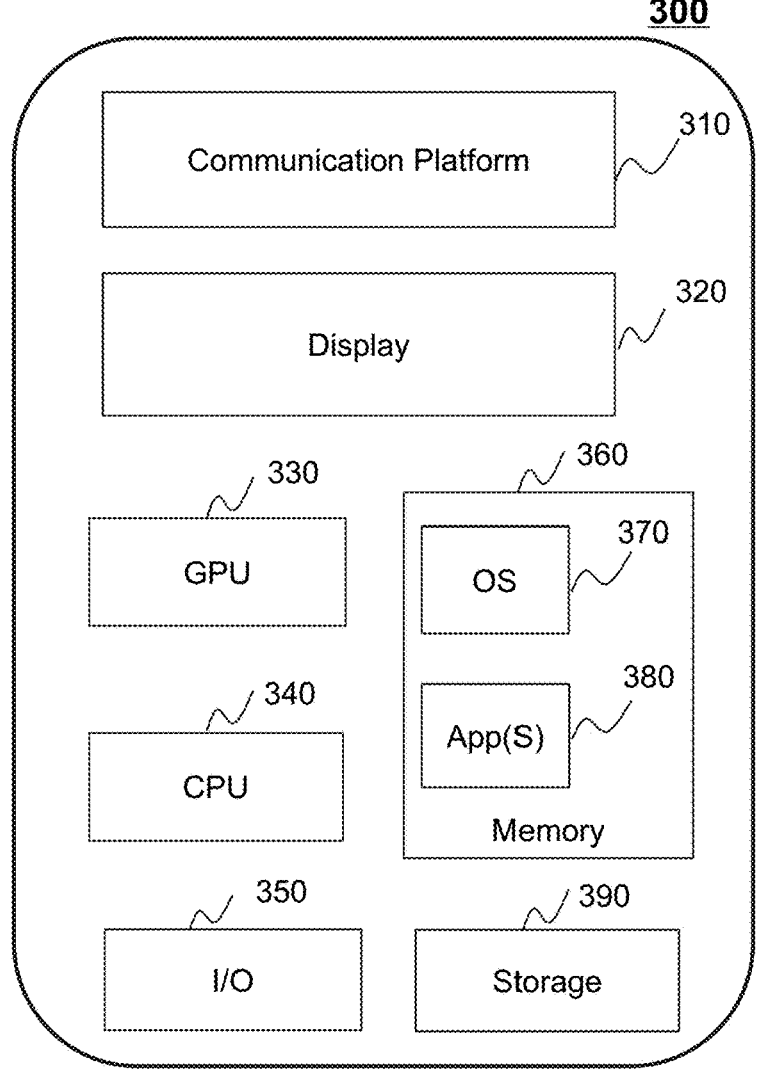
FIG. 3 is a schematic diagram illustrating hardware and/or software components of an exemplary mobile device according to some embodiments of the present disclosure.

FIG. 3 is a schematic diagram illustrating exemplary hardware and/or software components of an exemplary mobile device according to some embodiments of the present disclosure. In some embodiments, the processing device 140 or the terminal 130 may be implemented on the mobile device 300. As illustrated in FIG. 3, the mobile device 300 may include a communication platform 310, a display 320, a graphics processing unit (GPU) 330, a central processing unit (CPU) 340, an I/O 350, a memory 360, and storage 390. The CPU 340 may include interface circuits and processing circuits similar to the processor 210. In some embodiments, any other suitable component, including but not limited to a system bus or a controller (not shown), may also be included in the mobile device 300. In some embodiments, a mobile operating system 370 (e.g., iOS™, Android™, Windows Phone™) and one or more applications 380 may be loaded into the memory 360 from the storage 390 in order to be executed by the CPU 340. The applications 380 may include a browser or any other suitable mobile apps for receiving and rendering information relating to imaging from the blood vessel parameter determination system on the mobile device 300. User interactions with the information stream may be achieved via the I/O devices 350 and provided to the processing device 140 and/or other components of the imaging system 100 via the network 120.

To implement various modules, units, and their functionalities described in the present disclosure, computer hardware platforms may be used as the hardware platform(s) for one or more of the elements described herein. A computer with user interface elements may be used to implement a personal computer (PC) or any other type of work station or terminal device. A computer may also act as a server if appropriately programmed.

Figure 4:
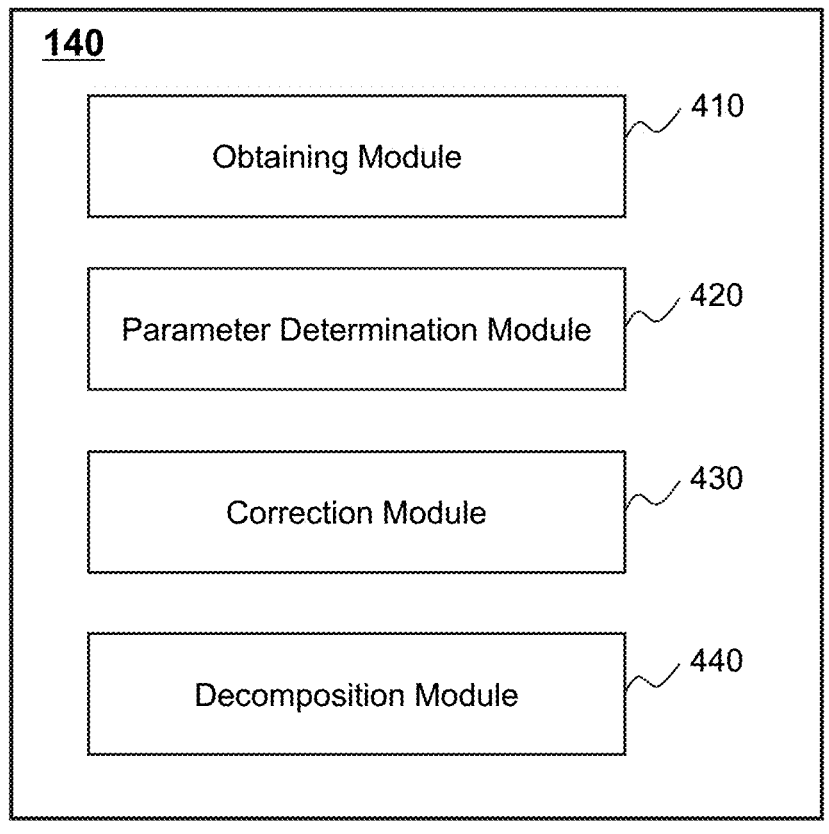
FIG. 4 is a block diagram illustrating an exemplary processing device according to some embodiments of the present disclosure.

FIG. 4 is a block diagram illustrating an exemplary processing device according to some embodiments of the present disclosure. As illustrated in FIG. 4, the processing device 140 may include an obtaining module 410, a parameter determination module 420, a correction module 430, and a decomposition module 440.

The obtaining module 410 may be configured to obtain information and/or data from one or more components of the present disclosure. In some embodiments, the obtaining module 410 may obtain scan projection data of a target object from the scanner 110 or a storage device of the imaging system 100. More descriptions regarding to the obtaining of the scan projection data of the target object may be found elsewhere in the present disclosure (e.g., operation 501 in FIG. 5 and relevant descriptions thereof).

The parameter determination module 420 may determine one or more pixel parameters of a preset model. For example, the parameter determination module 420 may obtain projection data of at least two reference materials. The parameter determination module 420 may determine actual pixel parameters and reference pixel parameters of the preset model based on the projection data of at least two reference materials and the preset model. The preset model may be configured to represent a correlation relationship between projected data of the at least two reference materials, the actual pixel parameters and the reference pixel parameters, and the at least two reference materials. In some embodiments, the parameter determination module 420 may include a data obtaining unit, a density obtaining unit, and a parameter determination unit. The at least two reference materials may include a first reference material and a second reference material. The data obtaining unit may be configured to obtain a plurality of sets of combined projection data of the first reference material and the second reference material with a plurality of thickness combinations. The data obtaining unit may also be configured to obtain thicknesses of the first reference material and thicknesses of the second reference material in the plurality of thickness combinations. The density obtaining unit may be configured obtain a first density of the first reference material and a second density of the second reference material. The parameter determination unit may determine the actual pixel parameters and the reference pixel parameters of the preset model by performing mathematic processing on pixel parameters of the preset model based on the plurality of sets of combined projection data, the thicknesses of the first reference material, the thickness of the second reference material, the first density, and the second density. In some embodiments, the parameter determination unit may include a mean processing sub-unit and a parameter determination sub-unit. The mean processing sub-unit may perform a mean operation on the plurality of sets of combined projection data of the first reference material and the second reference material with the plurality of thickness combinations. The parameter determination sub-unit may determine the reference pixel parameters of the preset model by inputting the plurality of mean projection data of the first reference material and the second reference material, the thicknesses of the first reference material, the thicknesses of the second reference material, the first density of the first reference material, and the second density of the second reference material to the preset model to perform the processing. In some embodiments, the parameter determination module 420 may also include a correction unit configured to perform a correction operation (e.g., a cosine correction) on the plurality of sets of combined projection data before inputting the plurality of sets of combined projection data into the preset model. More descriptions regarding the determination of the one or more pixel parameters of the preset model may be found elsewhere in the present disclosure (e.g., operations 503 in FIG. 5, FIGS. 6-8, and relevant descriptions thereof).

The correction module 430 may be configured to perform data correction and/or image reconstruction. For example, the correction module 430 may determine corrected projection data of the target object by performing a correction operation on the scan projection data of the target object, e.g., based on the one or more pixel parameters of the preset model. As another example, the correction module 430 may generate a reconstructed image of the target object by performing an image reconstruction operation on the corrected projection data. In some embodiments, the correction module 430 may include a density path determination unit and a correction unit. The density path determination unit may be configured to determine density path integrals of at least two target materials by inputting the actual pixel parameters and the scan projection data of the target object to the preset model. The correction unit may be configured to determine the corrected projection data of the target object by inputting the reference pixel parameters and the density path integrals of the at least two target materials into the preset model. More descriptions regarding the data correction and/or the image reconstruction may be found elsewhere in the present disclosure (e.g., operations 503 and 505 in FIG. 5, FIG. 9 and relevant descriptions thereof).

The decomposition module 440 may be configured to perform material decomposition on the reconstructed image. For example, the decomposition module 440 may determine density distribution images of at least two target materials of the target object by decomposing the reconstructed image. More descriptions regarding the material decomposition may be found elsewhere in the present disclosure (e.g., operation 507 in FIG. 5, operation 1217 in FIG. 12, and relevant descriptions thereof).

The modules in the processing device 140 may be connected to or communicated with each other via a wired connection or a wireless connection. The wired connection may include a metal cable, an optical cable, a hybrid cable, or the like, or any combination thereof. The wireless connection may include a Local Area Network (LAN), a Wide Area Network (WAN), a Bluetooth, a ZigBee, a Near Field Communication (NFC), or the like, or any combination thereof. Two or more of the modules may be combined into a single module, and any one of the modules may be divided into two or more units. In some embodiments, the above-mentioned modules may be integrated into a console (not shown). Via the console, a user may set scan parameters for scanning the target object, controlling imaging processes, controlling parameters for correcting the scan projection data, image reconstruction, and/or material decomposition, viewing images, etc. In some embodiments, the obtaining module 410, the correction module 430, and the decomposition module 440 may be implemented on a first processing device, and the parameter determination module 420 may be implemented on a second processing device that is different from the first processing device. In some embodiments, the processing device 140 may include a storage module (not shown) configured to store information and/or data (e.g., the scan projection data, the image(s)) associated with the above-mentioned modules.

Figure 5:
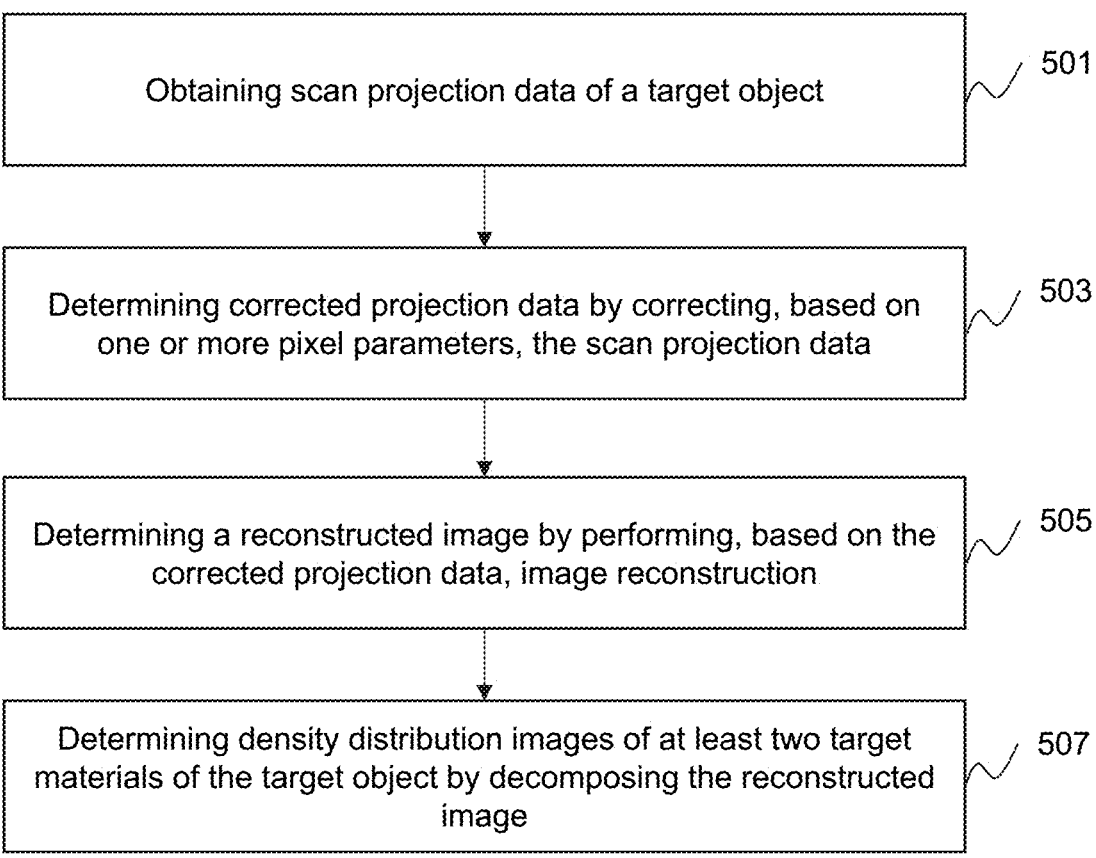
FIG. 5 is a flowchart illustrating an exemplary process for material decomposition according to some embodiments of the present disclosure.

FIG. 5 is a flowchart illustrating an exemplary process for material decomposition according to some embodiments of the present disclosure. In some embodiments, the process 500 may be implemented as a set of instructions (e.g., an application) stored in a storage device (e.g., the storage device 150, the storage device 220, and/or the storage 390). The processing device 140 (e.g., the processor 210, the CPU 340, and/or one or more modules illustrated in FIG. 4) may execute the set of instructions, and when executing the instructions, the processing device 140 may be configured to perform the process 500. The operations of the illustrated process presented below are intended to be illustrative. In some embodiments, the process 500 may be accomplished with one or more additional operations not described and/or without one or more of the operations discussed. Additionally, the order of the operations of process 500 illustrated in FIG. 5 and described below is not intended to be limiting.

In 501, the processing device 140 (e.g., the obtaining module 410) may obtain scan projection data of a target object.

In some embodiments, the target object may include a human being (e.g., the body or a part thereof), an animal, a plant, etc. The scan projection data of the target object may include projection data acquired by scanning the target object using a scanner (e.g., the scanner 110 such as a CT scanner or an X-ray scanner).

In some embodiments, the processing device 140 may direct the scanner 110 (e.g., a dual-energy CT device) to perform a scan on the target object, and directly obtain the scan projection data of the target object from the scanner 110. In some embodiments, the scan projection data of the target object may be pre-stored in a storage device (e.g., the storage device 150, the storage device 220, the storage 390, a local database, a cloud, an external storage device, etc.). The processing device 140 may retrieve the scan projection data of the target object from the storage device.

In 503, the processing device 140 (e.g., the parameter determination module 420 and/or the correction module 430) may determine corrected projection data by correcting, based on one or more pixel parameters, the scan projection data.

In some embodiments, the one or more pixel parameters may be determined by performing a model calibration on at least two reference materials. As used herein, a reference material may refer to a material (e.g., an organic or inorganic material) that has equivalent or substantially consistent attenuation characteristic(s) with a target material of the target object. The target object may include at least two target materials. Thus, there may be the at least two reference materials corresponding to the at least two target materials (e.g., each of the at least two reference materials corresponding to one of the at least two target materials). As used herein, a target material may refer to a basis material in the target object, such as water, calcium, lipid (or fat), of the target object. In some embodiments, the at least two reference materials may be determined/selected according to the at least target materials to be decomposed. For example, the target object may be the body of a human being or an animal. When it aims to distinguish the water and the calcium of bone in the body of the human being or the animal, the target materials may include the water and the calcium. In such cases, a reference material corresponding to the water may include polymethyl methacrylate (PMMA) which has equivalent or substantially consistent attenuation characteristics with the water. A reference material corresponding to the calcium may include aluminum (AL) that has equivalent or substantially consistent attenuation characteristics with the calcium.

In some embodiments, the model calibration may be pre-performed and the result (e.g., the one or more parameters of the preset model and the preset model) of the model calibration may be stored in a storage device (e.g., the storage device 150, the storage device 220, or the storage 390). The processing device 140 may obtain the result of the model calibration for correction. In some embodiments, the model calibration may be performed by a third part of the imaging system 100 (e.g., a vendor or a manufacture of the imaging system 100). In some embodiments, the model calibration may be performed by the processing device 140. For example, in response to obtaining the scan projection data of the target object, the processing device 140 may be triggered to perform the model calibration to determine the result of the model calibration, and then determine the corrected projection data based on the result of the model calibration. Hereafter, the model calibration may be described to be implemented by the processing device 140 for illustration purposes.

In some embodiments, the model calibration may include determining the one or more pixel parameters based on projection data of the at least two reference materials and a preset model. By using the at least two reference materials each of which has substantially consistent attenuation characteristic(s) with a corresponding target material to determine the pixel parameters (e.g., the actual pixel parameters and/or the reference pixel parameters) of the preset model, the determined pixel parameters of the preset model may be more representative and more accuracy, thereby improving the accuracy of the material decomposition. In some embodiments, the at least two reference materials may be configured as material flat plates, and the material flat plates may be positioned such that a normal vector of each of the material flat plates has a consistent direction with an iso-centric ray of a radiation source of the imaging device 110. For instance the reference materials of AL and PMMA may be homogeneous and configured as homogeneous material flat plates. By using the homogeneous material flat plates that have a homogeneous thickness, the projection data of the at least two reference materials may be homogeneous, thereby improving the accuracy of the subsequent material decomposition which is performed based on the projection data of the at least two reference materials.

In some embodiments, the projection data of the at least two reference materials may be acquired by scanning the at least two reference materials using a scanner (e.g., the scanner 110 such as a CT scanner or an X-ray scanner). For example, each of the at least two reference materials may be scanned independently, e.g., the at least two reference materials may be scanned in sequence. Projection data of each of the at least two reference materials may be combined to obtain the projection data of the at least two reference materials. As another example, the at least two reference materials may be combined, and the combination may be scanned together to obtain the projection data of the at least two reference materials. In some embodiments, the at least two reference materials may be combined with different thickness combinations (e.g., a plurality of thickness combinations). For example, the at least two reference materials with each of the plurality of thickness combinations may be scanned independently to obtain a set of combined projection data. A plurality of sets of combined projection data corresponding to the plurality of thickness combinations may be combined to obtain the projection data of the at least two reference materials. That is, the projection data of the at least two reference materials may include the plurality of sets of combined projection data of the at least two reference materials. As another example, the at least two reference materials with the plurality of thickness combinations may be scanned together to obtain the projection data of the at least two reference materials.

In some embodiments, the one or more pixel parameters may include actual pixel parameter(s) of the preset model, reference pixel parameter(s) of the preset model, or the like, or any combination thereof. As used herein, the actual pixel parameter(s) of the preset model refer to pixel parameters of the preset model that are determined based on projection data of the at least two reference materials that are not processed. The reference pixel parameter(s) of the preset model refer to pixel parameters of the present model that are determined based on projection data of the at least two reference materials that are processed. In other words, the reference pixel parameters may be regarded as corrected actual pixel parameters. The processing device 140 may determine the actual pixel parameters and the reference pixel parameters of the preset model by processing (e.g., performing a mathematic operation on) the projection data of the at least two reference materials via inputting the projection data of the at least two reference materials into the preset model. As used herein, the preset model may include a forward model and be configured to represent a correlation relationship between the projected data of the at least two reference materials, pixel parameters, and the at least two reference materials. For example, the preset model may include a mathematical expression that represents the correlation relationship between the projected data of the at least two reference materials, the pixel parameters, and the at least two reference materials. As another example, the preset model may include a network model that represents the correlation relationship between the projected data of the at least two reference materials, the pixel parameters, and the at least two reference materials. As used herein, the pixel parameters may be parameters of the preset model, e.g., the actual pixel parameters and/or the reference pixel parameters of the preset model. For example, the actual pixel parameters may be determined by directly inputting the projection data of the at least two reference materials into the preset model. As another example, the reference pixel parameters may be determined by further processing the actual pixel parameters. Alternatively, the reference pixel parameters may be determined by inputting processed projection data of the at least two reference materials into the preset model. More descriptions regarding the determination of the one or more pixel parameters may be found elsewhere in the present disclosure (e.g., FIGS. 6-8 and relevant descriptions thereof).

In some embodiments, in actual applications, for different patients, scan parameters and/or acquisition parameters may be different, which leads to different results of model calibration. Accordingly, for different sets of scan parameters and/or acquisition parameters, different model calibrations may be determined to obtain different results of model calibration corresponding to the different sets of scan parameters and/or acquisition parameters respectively. Thus, the processing device 140 may determine a target set of scan parameters and/or acquisition parameters under which the scan projection data of the target object is acquired. The processing device 140 may determine the one or more pixel parameters corresponding to the target set of scan parameters and/or acquisition parameters for correcting the scan projection data.

In some embodiments, after obtaining the actual pixel parameters and the reference pixel parameters, the processing device 140 may perform an initial correction on the scan projection data of the target object based on the actual pixel parameters to obtain initial corrected projection data. The processing device 140 may perform further correction on the initial corrected projection data to obtain the corrected projection data. More descriptions regarding the correction of the scan projection data may be found elsewhere in the present disclosure (e.g., FIG. 9 and the relevant description thereof).

In 505, the processing device 140 (e.g., the correctio module 430)) may determine a reconstructed image by performing, based on the corrected projection data, image reconstruction.

In some embodiments, the processing device 140 may perform the image reconstruction using an image reconstruction algorithm. The image reconstruction algorithm may include a filtered back-projection(FBP) algorithm, an FDK algorithm, an iterative algorithm, or the like, or any combination thereof. In some embodiments, the reconstructed image may also be referred to as an image to be decomposed. In some embodiments, for the projection data acquired by a detector having two energy bins, the reconstructed image may include a first reconstructed image and a second reconstructed image. For example, the first reconstructed image may be reconstructed based on projection data acquired by a first energy bin, and the second reconstructed image may be reconstructed based on projection data acquired by a second energy bin. That is, the first reconstructed image may correspond to a high energy spectrum, and the second reconstructed image may correspond to a low energy spectrum.

In 507, the processing device 140 (e.g., the decomposition module 440) may determine density distribution images of at least two target materials of the target object by decomposing the reconstructed image.

Each of the density distribution images of the at least two target materials of the target object may correspond to one of the at least two target materials. That is, the at least two target materials may correspond to at least two density distribution images. That is, a density distribution image of a target material of the target object may be an image that reflects the density distributions of the target material in the target object. For brevity, the density distribution images of the at least two target materials may also be referred to as images of the at least two target materials.

In some embodiments, the processing device 140 may decompose the reconstructed image using a material decomposition algorithm in image domain to obtain the image of the at least two target materials (e.g., the water and the calcium). The material decomposition algorithm in image domain may include a $\mu$ value-based decomposition algorithm, a CT value-based decomposition algorithm, a Kalender's correlated noise reduction(KCNR) algorithm, or the like, or any combination thereof. More descriptions regarding the material decomposition may be found elsewhere in the present disclosure (e.g., operation 1217 in FIG. 12 and relevant descriptions thereof).

It should be noted that the above description regarding the process 500 is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. In some embodiments, one or more operations may be added to or omitted from the process 500. For example, the process 500 may include an additional operation for causing the density distribution images of at least two target materials of the target object to be displayed. As another example, a storing operation may be added elsewhere in the process 500. In the storing operation, the processing device 140 may store information and/or data disclosed elsewhere in the present disclosure. In some embodiments, an operation of the process 500 may be divided into at least two sub-operations. For example, operation 503 may be divided into two sub-operations, one of which is for determining the one or more pixel parameters and another one of which is for correcting the scan projection data of the target object. In some embodiments, operations 505 and 507 may be omitted. The processing device 140 may directly perform the material decomposition on the corrected projection data. The processing device 140 may determine the density distribution images of at least two target materials of the target object by reconstructing the decomposed projection data. More descriptions regarding performing the material decomposition in projection domain may be found elsewhere in the present disclosure (e.g., FIG. 11 and relevant description thereof).

Figure 6:
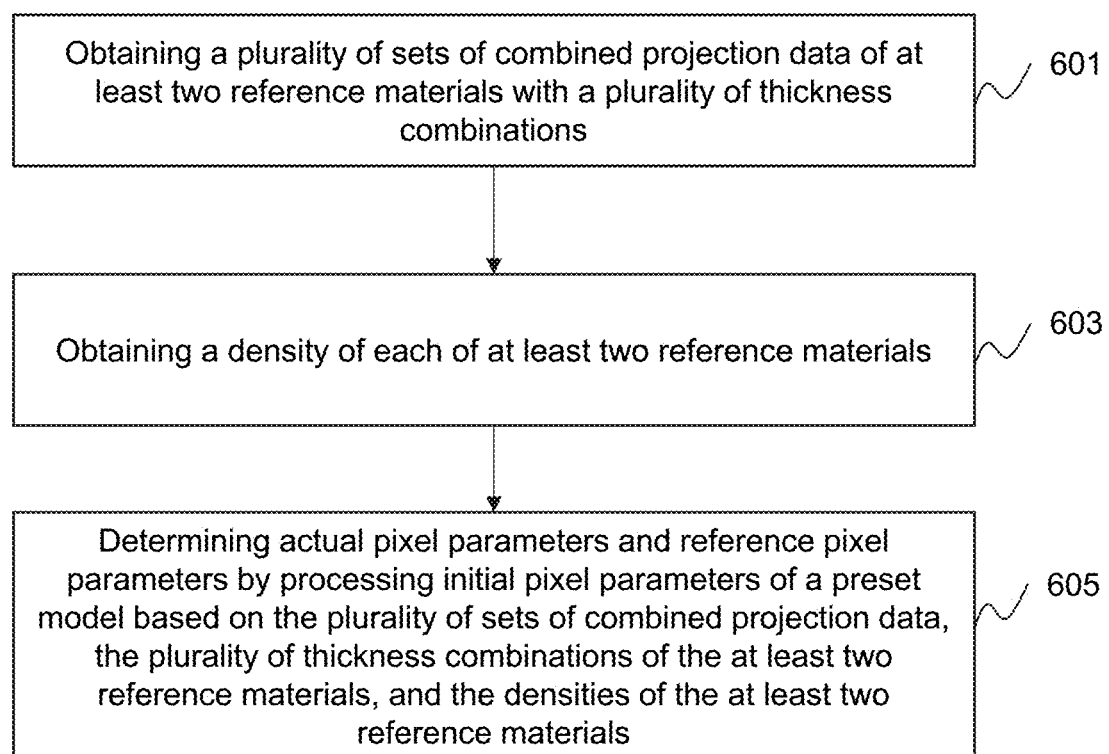
FIG. 6 is a schematic diagram illustrating an exemplary process for determining one or more pixel parameters according to some embodiments of the present disclosure.

FIG. 6 is a flowchart illustrating an exemplary process for determining one or more pixel parameters according to some embodiments of the present disclosure. In some embodiments, the process 600 may be implemented as a set of instructions (e.g., an application) stored in a storage device (e.g., the storage device 150, the storage device 220, and/or the storage 390). The processing device 140 (e.g., the processor 210, the CPU 340, and/or one or more modules illustrated in FIG. 4) may execute the set of instructions, and when executing the instructions, the processing device 140 may be configured to perform the process 600. The operations of the illustrated process presented below are intended to be illustrative. In some embodiments, the process 600 may be accomplished with one or more additional operations not described and/or without one or more of the operations discussed. Additionally, the order of the operations of process 600 illustrated in FIG. 6 and described below is not intended to be limiting. In some embodiments, a portion of operation 503 in FIG. 5 may be achieved by the process 600. In some embodiments, the process 600 may be implemented by a processing device of a third party that can provide the one or more pixel parameters for material decomposition.

Figure 7:
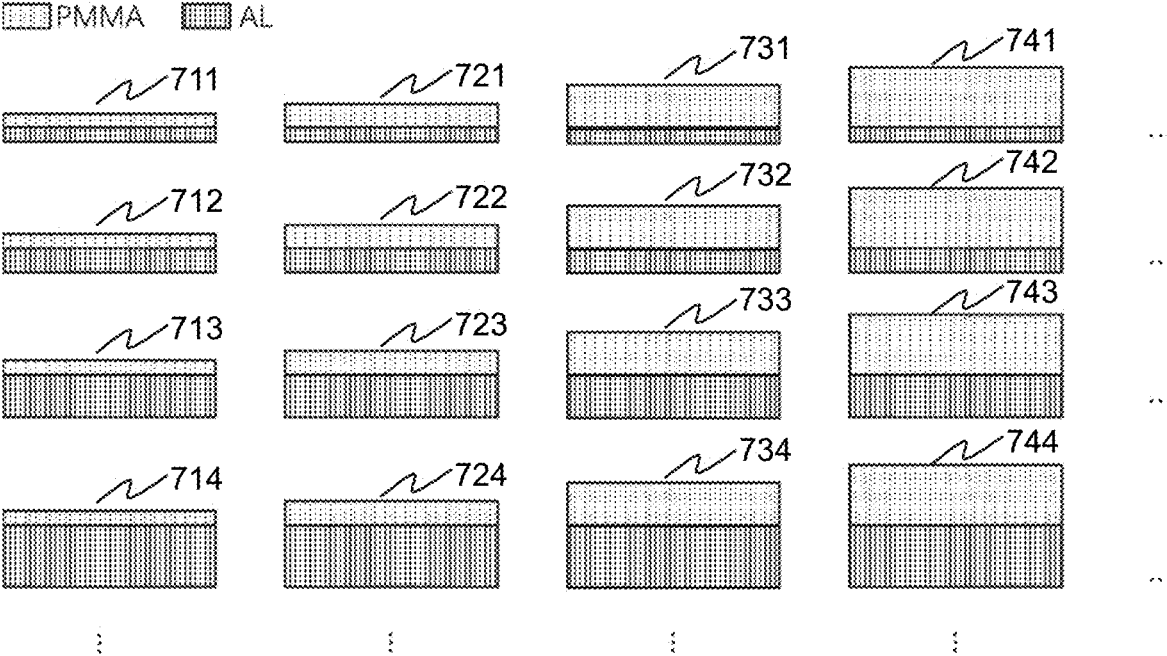
FIG. 7 is a schematic image illustrating exemplary reference materials according to some embodiments of the present disclosure.

In 601, the processing device 140 (e.g., the parameter determination module 420) may obtain a plurality of sets of combined projection data of at least two reference materials with a plurality of thickness combinations. Each of the plurality of sets of combined projection data may correspond to one of the plurality of thickness combinations. For example, as shown in FIG. 7, a thickness combination 711 may correspond to a set of combined projection data.

As described in 503, the at least two reference materials may be combined with the plurality of thickness combinations. For illustration purposes, assuming that there are two reference materials (e.g., the first reference material and the second reference material), the first reference material and the second material may be combined with the plurality of thickness combinations. For example, the first reference material may include AL, and the second reference material may include PMMA. As shown in FIG. 7, the first reference material AL and the second reference material PMMA are combined with a plurality of thickness combinations (e.g., thickness combinations 711, 712, 713, 714, . . . , 721, 722, 723, 724, . . . , 731, 732, 733, 734, . . . , 741, 742, 743, 744, . . . ). Thicknesses of AL in thickness combinations arranged in a same row (e.g., along the horizontal direction in FIG. 7) are the same, and thicknesses of PMMA in thickness combinations arranged in the same row are different. Thicknesses of PMMA in thickness combinations arranged in a same column (e.g., along the vertical direction in FIG. 7) are the same, and thicknesses of AL in thickness combinations arranged in the same column are different. As used herein, a thickness of a specific reference material (e.g., the first reference material or the second material) may refer to the thickness of the reference material in a specific thickness combination. The thicknesses of the specific reference material in different thickness combinations may be the same or different.

In some embodiments, the plurality of thickness combinations may be pre-determined or preset and stored in a storage device (e.g., the storage device 150, the storage device 220, the storage 390, or an external storage device). The processing device 140 may obtain the plurality of thickness combinations and specific thicknesses of the at least two reference materials thereof from the storage device. In some embodiments, the processing device 140 may obtain the plurality of thickness combinations and specific thicknesses of the at least two reference materials thereof according to a user input.

In some embodiments, the processing device 140 may cause the scanner 110 to perform a scan on the at least two reference materials with each of the plurality of thickness combinations to obtain the plurality of sets of combined projection data of the at least two reference materials with the plurality of thickness combinations. In some embodiments, the plurality of sets of combined projection data of the at least two reference materials with the plurality of thickness combinations may be pre-stored in a storage device (e.g., the storage device 150, the storage device 220, the storage 390, or an external storage device). The processing device 140 may retrieve the plurality of sets of combined projection data of the at least two reference materials with the plurality of thickness combinations from the storage device. More descriptions regarding the obtaining of the plurality of sets of combined projection data of the at least two reference materials with the plurality of thickness combinations may be found elsewhere in the present disclosure (e.g., operation 503 in FIG. 5 and relevant descriptions thereof). In some embodiments, the plurality of sets of combined projection data of the at least two reference materials may be air-corrected logarithmic values. As used herein, the air-corrected logarithmic values indicate that the plurality of sets of combined projection data of the at least two reference materials have been corrected in log domain. The correction in log domain can correct projection data of damaged channel(s), e.g., to avoid or reduce hardening artifacts in subsequent images.

In 603, the processing device 140 (e.g., the parameter determination module 420) may obtain a density of each of the at least two reference materials.

In some embodiments, once the types of the at least two reference materials are determined, the densities of the at least two reference materials are fixed values. For illustration purposes, assuming that there are two reference materials (e.g., the first reference material and the second reference material), the first reference material may include a first density, and the second reference material may include a second density. For example, the first reference material may include AL, and the second reference material may include PMMA. In such cases, the first density of AL may be $\rho_{PMMA}$=1.19 g/cm$^3$, and the second density of PMMA may be $\rho_{AL}$=2.6989 g/cm$^3$.

In 605, the processing device 140 (e.g., the parameter determination module 420) may determine actual pixel parameters and reference pixel parameters by processing initial pixel parameters of the preset model based on the plurality of sets of combined projection data, the plurality of thickness combinations of the at least two reference materials, and the densities of the at least two reference materials.

In some embodiments, assuming that the detector (e.g., a photon counting detector of the scanner 110) used for projection data acquisition has two energy bins (represented by b1 and b2). For the target object including the water and the calcium, the PMMA flat plate corresponding to the water and the AL flat plate corresponding to the calcium may be selected as reference materials, and a corresponding approximate function may be selected as the preset model. That is, the preset model may be expressed as the approximate function. Merely by way of example, the approximate function may include a third-order polynomial, which is expressed as follows:

$$P_{b1} = c_{10} + c_{11}A_{AL} + c_{12}A_{PMMA} + c_{13}A_{AL}^2 + c_{14}A_{AL}A_{PMMA} + \quad (1)$$
$$c_{15}A_{PMMA}^2 + c_{16}A_{AL}^3 + c_{17}A_{AL}^2A_{PMMA} + c_{18}A_{AL}A_{PMMA}^2 + c_{19}A_{PMMA}^3,$$

$$P_{b2} = c_{20} + c_{21}A_{AL} + c_{22}A_{PMMA} + c_{23}A_{AL}^2 + c_{24}A_{AL}A_{PMMA} + \quad (2)$$
$$c_{25}A_{PMMA}^2 + c_{26}A_{AL}^3 + c_{27}A_{AL}^2A_{PMMA} + c_{28}A_{AL}A_{PMMA}^2 + c_{29}A_{PMMA}^3,$$

where $P_{b1}$ and $P_{b2}$ denote a set of combined projection data acquired by two energy bins b1 and b2 of the photon counting detector, parameters $c_{10}$~$c_{19}$ denote polynomial parameters of the approximate function in the energy bin b1 of the photon counting detector, parameters $c_{20}$~$c_{29}$ denote polynomial parameters of the approximate function in the energy bin b2 of photon counting detector, i.e., the parameters $c_{10}$~$c_{19}$ and $c_{20}$~$c_{29}$ are pixel parameters. $A_{PMMA}$ denotes a density path integral of the PMMA flat plate. If the thickness of the PMMA flat plate is denoted by $t_{PMMA}$, $A_{PMMA}$ may be denoted by $A_{PMMA}$=$\rho_{PMMA}$·$t_{PMMA}$. $A_{AL}$ denotes a density path integral of the AL flat plat. If the thickness of the AL flat plate is denoted by $t_{AL}$, $A_{AL}$ may be denoted by $A_{AL}$=$\rho_{AL}$·$t_{AL}$. As described above, the densities of the PMMA flat plate and the AL flat plate and the plurality of thickness combinations are known, thus the density path integrals under the plurality of thickness combinations may be determined.

After the expression of the preset model (e.g., formulas (1) and (2)) are obtained, the sets of combined projection data (i.e., $P_{b1}$ and $P_{b2}$), $A_{PMMA}$, and $A_{AL}$ in the plurality of thickness combinations may be brought into the formulas (1) and (2) to determine the polynomial parameters $c_{10}$~$c_{19}$ and $c_{20}$~$c_{29}$ via polynomial calculation. The polynomial parameters $c_{10}$~$c_{19}$ and $c_{20}$~$c_{29}$ may be determined as the actual pixel parameters. It should be noted that a count of the plurality of thickness combinations of the PMMA flat plate and the AL flat plate needs to be equal to or greater than a count of the respective parameters (e.g., the polynomial parameters in formula (1) or (2)). For example, as used herein, the count of the plurality of thickness combinations needs to be equal to or greater than 10, such that the pixel parameters of $c_{10}$~$c_{19}$ and $c_{20}$~$c_{29}$ can be determined. In some embodiments, the polynomial parameters may be determined according to a Moore-Penrose pseudoinverse algorithm, a least square algorithm, a linear optimization algorithm, a non-linear optimization algorithm (e.g., a Gauss-Newton algorithm), or the like, or any combination thereof.

In some embodiments, after the actual pixel parameters are determined, the processing device 140 may determine the reference pixel parameters based on the actual pixel parameters. In some embodiments, the processing device 140 may determine the reference pixel parameters based on a plurality of sets of mean projection data corresponding to the plurality of sets of combined projection data, more descriptions thereof may be found elsewhere in the present disclosure (e.g., FIG. 8 and the relevant description thereof).

It should be noted that the above description regarding the process 600 is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. In some embodiments, one or more operations may be added to or omitted from the process 600. In some embodiments, an operation of the process 600 may be divided into two or more sub-operations.

FIG. 8 is a schematic diagram illustrating an exemplary process for determining reference pixel parameters according to some embodiments of the present disclosure. In some embodiments, the process 800 may be implemented as a set of instructions (e.g., an application) stored in a storage device (e.g., the storage device 150, the storage device 220, and/or the storage 390). The processing device 140 (e.g., the processor 210, the CPU 340, and/or one or more modules illustrated in FIG. 4) may execute the set of instructions, and when executing the instructions, the processing device 140 may be configured to perform the process 800. The operations of the illustrated process presented below are intended to be illustrative. In some embodiments, the process 800 may be accomplished with one or more additional operations not described and/or without one or more of the operations discussed. Additionally, the order of the operations of process 800 as illustrated in FIG. 8 and described below is not intended to be limiting. In some embodiments, a portion of operation 605 may be achieved by the process 800.

In 801, the processing device 140 (e.g., the parameter determination module 420) may determine a set of mean projection data by performing a mean operation on each set of a plurality of sets of combined projection data of at least two reference materials with a plurality of thickness combinations, to obtain a plurality of sets of mean projection data.

In some embodiments, a set of combined projection data (i.e., $P_{b1}$ and $P_{b2}$) may be acquired by performing a scan on at least two reference materials with a thickness combination (e.g., the thickness 711 in FIG. 7) by a detector (e.g., the detector 115). The set of combined projection data may relate to a plurality of pixels of an image that is generated based on the set of combined projection data. As used herein, the mean operation performed on a set of combined projection data refers to an operation for averaging out (e.g., removing) high-frequency components (e.g., components corresponding to abnormal pixels) from the set of combined projection data. That is, projection data of each pixel of the plurality of pixels corresponding to the set of combined projection data may be processed. For example, for each set of combined projection data (i.e., $P_{b1}$ and $P_{b2}$), the processing device 140 may perform a filtering processing on the set of combined projection data in each pixel to determine the set of corrected combined projection data. As another example, for each set of the plurality of sets of combined projection data, the processing device 140 may perform a weighted average processing on the set of the combined projection data in each pixel to determine the set of corrected combined projection data. It should be noted that the mean operation may include any other manner, not limited to the filtering processing or the weighted average processing.

In 803, the processing device 140 (e.g., the parameter determination module 420) may determine reference pixel parameters of a preset model by inputting the plurality of sets of mean projection data, the plurality of thickness combinations of the at least two reference materials, and densities of the at least two reference materials to the preset model to perform a processing.

As described in connection with FIG. 6, after the plurality of sets of combined projection data of the at least two reference materials with the plurality of thickness combinations are obtained, the density path integrals of the at least two reference materials may be obtained. Then, the plurality of sets of mean projection data, $A_{PMMA}$, and $A_{AL}$ under the plurality of thickness combinations may be brought into formulas (3) and (4), which are similar to the formulas (1) and (2) to determine the reference pixel parameters as follows:

$$P'_{b1} = c'_{10} + c'_{11}A_{AL} + c'_{12}A_{PMMA} + c'_{13}A^2_{AL} + c'_{14}A_{AL}A_{PMMA} + \quad (3)$$
$$c'_{15}A^2_{PMMA} + c'_{16}A^3_{AL} + c'_{17}A^2_{AL}A_{PMMA} + c'_{18}A_{AL}A^2_{PMMA} + c'_{19}A^3_{PMMA},$$

$$P'_{b2} = c'_{20} + c'_{21}A_{AL} + c'_{22}A_{PMMA} + c'_{23}A^2_{AL} + c'_{24}A_{AL}A_{PMMA} + \quad (4)$$
$$c'_{25}A^2_{PMMA} + c'_{26}A^3_{AL} + c'_{27}A^2_{AL}A_{PMMA} + c'_{28}A_{AL}A^2_{PMMA} + c'_{29}A^3_{PMMA},$$

where $P_{b1}'$ and $P_{b2}'$ denote a set of corrected combined projection data, and polynomial parameters c10'~c19' and c20'~c29' denote the reference pixel parameters.

In some embodiments, additional detectors that with excellent performance, also referred to as ideal detectors, may be used to obtain a plurality of sets of combined projection data of the at least two reference materials with the plurality of thickness combinations as the plurality of sets of mean projection data in operation 801 for determining the reference pixel parameters.

According to some embodiments of the present disclosure, by the sets of combined projection data, the densities, and the thicknesses of the at least two reference materials with the plurality of thickness combinations, the actual pixel parameters (e.g., the polynomial parameters $c_{10}$~$c_{19}$ and $c_{20}$~$c_{29}$ in formulas (1) and (2)) and the reference pixel parameters (e.g., the polynomial parameters $c_{10}$'~$c_{19}$' and $c_{20}$'~$c_{29}$' in formulas (3) and (4)) of the preset model (e.g., the formulas (1) and (2), or formulas (3) and (4) may be determined. According to the calculation by multiple sets of data, the determined pixel parameters may be relatively accurate, thus the determined preset model may be relatively accurate, thereby improving the accuracy of material decomposition using the preset model. Further, by the mean operation on each of the plurality of sets of combined projection data, the determined reference pixel parameters may provide a relatively accurate data basis for subsequent correction of the scan projection data of the target object.

It should be noted that the above description regarding the process 800 is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. In some embodiments, one or more operations may be added to or omitted from the process 800. In some embodiments, an operation of the process 800 may be divided into two or more sub-operations.

In some embodiments, before the determination of the pixel parameters of the preset model, the plurality of sets of combined projection data may be pre-processed for improving the accuracy of the pixel parameters. For example, before operation 603, a correction operation may be performed on each set of the plurality of sets of combined projection data to determine a plurality of sets of corrected combined projection data. For instance, the correction operation may include a cosine correction. The cosine correction may be performed on each set of the plurality of combined projection data to determine the corresponding plurality of sets of corrected combined projection data. The cosine correction may include multiplying each set of the plurality of sets of combined projection data by a corresponding cosine value. For a set of combined projection data, each pixel relating to the set of the combined projection data may correspond to a cosine value of an angle that is formed by a central ray of the radiation source and a ray connecting the radiation source and the pixel. As used herein, each pixel refers to a pixel in an image that is generated based on the set of the combined projection data. As the radiation source of the scanner 110 is a point source, when the radiation source of the scanner scans the at least two reference materials with the plurality of thickness combinations and the thicknesses corresponding to the plurality of thickness combinations are known, a distance of a line connecting the radiation source and each pixel of the detector that passes through each of the plurality of thickness combinations may need to be corrected. Accordingly, the cosine correction actually refers to correcting a distance of a ray of the radiation source that passes through reference materials with a corresponding thickness combination.

According to the cosine correction, the plurality of sets of combined projection data can be corrected based on flat plates with homogeneous thicknesses, which avoids the inaccuracy of the plurality of sets of combined projection data that is caused by the edge of the reference material flat plate being not perpendicular to the ray passing through the reference material flat plate, thereby improving the accuracy of the plurality of sets of combined projection data. Therefore, the accuracy of the pixel parameters of the preset model determined based on the accurate combined projection data may be improved.

FIG. 9 is a schematic diagram illustrating an exemplary process for projection data correction according to some embodiments of the present disclosure. In some embodiments, the process 900 may be implemented as a set of instructions (e.g., an application) stored in a storage device (e.g., the storage device 150, the storage device 220, and/or the storage 390). The processing device 140 (e.g., the processor 210, the CPU 340, and/or one or more modules illustrated in FIG. 4) may execute the set of instructions, and when executing the instructions, the processing device 140 may be configured to perform the process 900. The operations of the illustrated process presented below are intended to be illustrative. In some embodiments, the process 900 may be accomplished with one or more additional operations not described and/or without one or more of the operations discussed. Additionally, the order of the operations of process 900 as illustrated in FIG. 9 and described below is not intended to be limiting. In some embodiments, a portion of operation 503 in FIG. 5 may be achieved by the process 900.

In 901, the processing device 140 (e.g., the parameter determination module 420 and/or the correction module 430) may determine density path integrals of at least two target materials by inputting actual pixel parameters and scan projection data of a target object to a preset model.

As described in connection with FIG. 6, after the actual pixel parameters $c_{10} \sim c_{19}$ and $c_{20} \sim c_{29}$ and the scan projection data of the target object are obtained, they may be brought into the formulas (1) and (2), e.g., the scan projection data of the target object may be brought into the formulas (1) and (2) as $P_{b1}$ and $P_{b2}$. By a series of calculations of the formulas (1) and (2), the density path integrals (e.g., $A_{PMMA}$ and $A_{AL}$) of the at least two reference materials in formulas (1) and (2) may be obtained as the density path integrals of the at least two target materials.

In 903, the processing device 140 (e.g., the correction module 430) may determine corrected projection data of the target object by inputting the reference pixel parameters and the density path integrals of the at least two target materials to the preset model.

As described in connection with FIG. 7, after the density path integrals of the at least two target materials and the reference pixel materials are determined, the processing device 140 may bring the density path integrals of the at least two target materials (e.g., the $A_{PMMA}$ and $A_{AL}$) determined in 901 and the reference pixel parameters (e.g., the parameters $c_{10}' \sim c_{19}'$ and $c_{20}' \sim c_{29}'$) into the formulas (3) and (4) to determine $P_{b1}'$ and $P_{b2}'$ in formulas (3) and (4) as the corrected projection data.

It should be noted that the above description regarding the process 900 is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. In some embodiments, one or more operations may be added to or omitted from the process 900. In some embodiments, an operation of the process 900 may be divided into two or more sub-operations.

Figure 10:
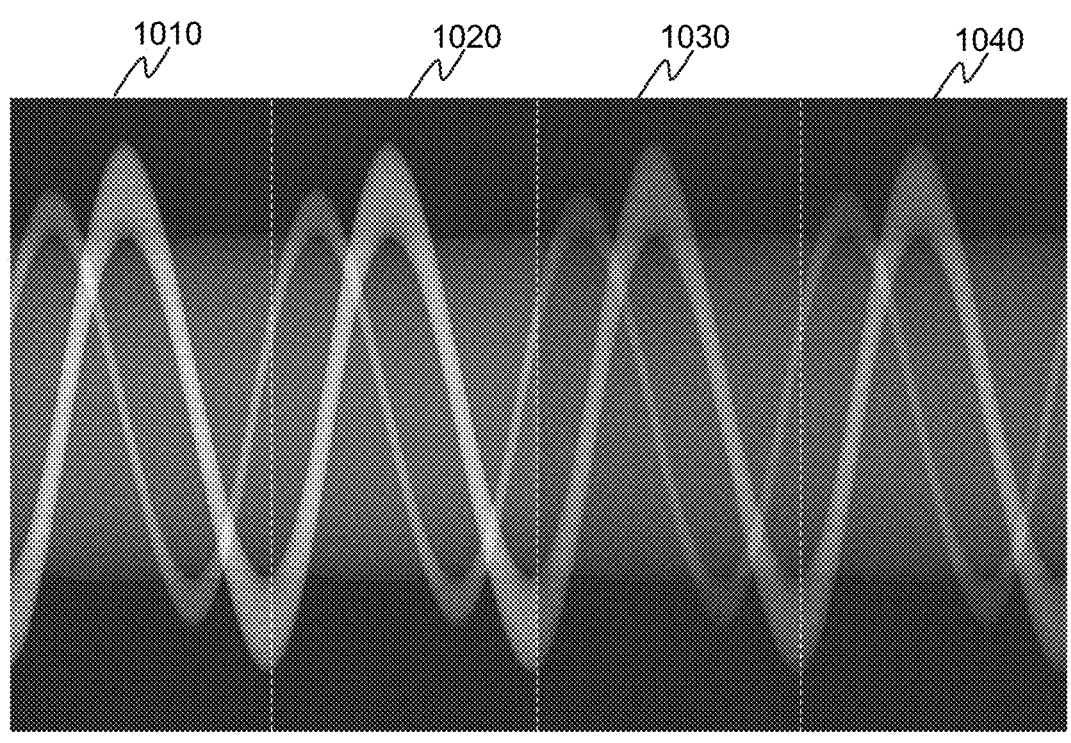
FIG. 10 is a schematic diagram illustrating exemplary corrected images according to some embodiments of the present disclosure.

FIG. 10 is a schematic diagram illustrating exemplary corrected images according to some embodiments of the present disclosure. As shown in FIG. 10, column 1010 shows a sinusoidal image (i.e., scan projection data) acquired by the energy bin b1 of the detector; column 1020 shows a corrected sinusoidal image (i.e., corrected projection data) of the sinusoidal image in column 1010; column 1030 shows a sinusoidal image (i.e., scan projection data) acquired by the energy bin b2 of the detector; and column 1040 shows a corrected sinusoidal image (i.e., corrected projection data) of the sinusoidal image in column 1030. According to the sinusoidal images in columns 1010-1040, the corrected projection data has better performance in noises and steak artifacts, i.e., fewer noises and streak artifacts, and the image corresponding to the corrected projection data has better image quality.

According to some embodiments of the present disclosure, the scan projection data may be corrected by the actual pixel parameters and the reference pixel parameters of the preset model, thus the obtained projection data may be relatively accurate. When accurate projection data is used for image reconstruction and further material decomposition, the image of the at least two target materials may be relatively accurate.

Figure 11:
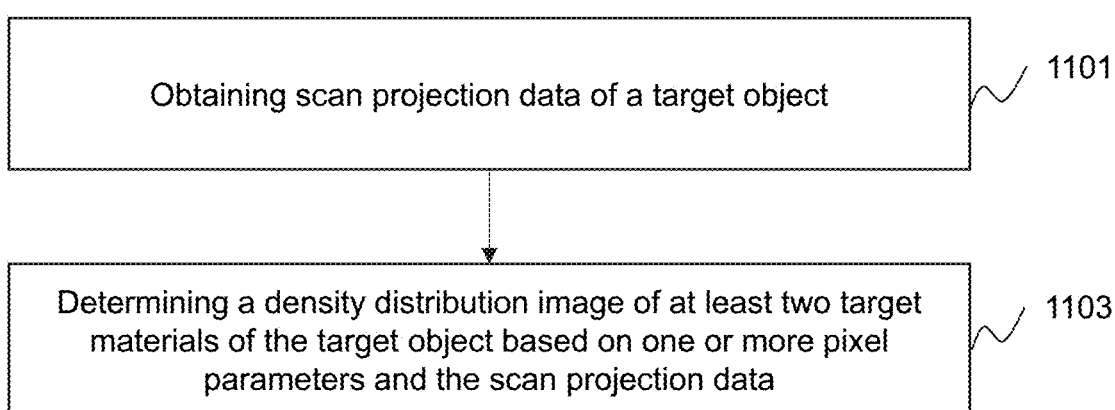
FIG. 11 is a schematic diagram illustrating an exemplary process for material decomposition according to some embodiments of the present disclosure.

FIG. 11 is a flowchart illustrating an exemplary process for material decomposition according to some embodiments of the present disclosure. In some embodiments, the process 1100 may be implemented as a set of instructions (e.g., an application) stored in a storage device (e.g., the storage device 150, the storage device 220, and/or the storage 390). The processing device 140 (e.g., the processor 210, the CPU 340, and/or one or more modules illustrated in FIG. 4) may execute the set of instructions, and when executing the instructions, the processing device 140 may be configured to perform the process 1100. The operations of the illustrated process presented below are intended to be illustrative. In some embodiments, the process 1100 may be accomplished with one or more additional operations not described and/or without one or more of the operations discussed. Additionally, the order of the operations of process 1100 illustrated in FIG. 11 and described below is not intended to be limiting.

In 1101, the processing device 140 (e.g., the obtaining module 410) may obtain scan projection data of a target object. The scan projection data of the target object may be the same as or similar to the scan projection data of the target object, more descriptions of which may be found elsewhere in the present disclosure (e.g., operation 501 in FIG. 5 and relevant descriptions thereof).

In 1102, the processing device 140 (e.g., the decomposition module 440) may determine a density distribution image of at least two target materials of the target object based on one or more pixel parameters and the scan projection data.

In some embodiments, the processing device 140 may determine the material decomposition in image domain. For example, the processing device 140 may determine corrected projection data by correcting, based on the one or more pixel parameters, the scan projection data. The processing device 140 may determine a reconstructed image by performing, based on the corrected projection data, image reconstruction. The processing device 140 may determine the density distribution image of the at least two target materials of the target object by decomposing the reconstructed image. More descriptions regarding the material decomposition in image domain may be found elsewhere in the present disclosure (e.g., operations 503-507 in FIG. 5 and the relevant descriptions thereof).

In some embodiments, the processing device 140 may determine the material decomposition in projection domain. For example, the processing device 140 may decompose the at least two target materials in projection domain based on the scan projection data. For instance, the processing device 140 may determine density path integrals of the at least two target materials based on the one or more pixel parameters and the scan projection data. The processing device 140 may reconstruct the density distribution image of at least two target materials based on the density path integrals. In some embodiments, the one or more pixel parameters may be determined by performing a model calibration on at least two reference materials. The at least two reference materials may correspond to the at least two target materials. More descriptions regarding the model calibration and the at least two reference materials may be found elsewhere in the present disclosure (e.g., operation 503 in FIG. 5, FIG. 6, and FIG. 8 and the relevant descriptions thereof).

It should be noted that the above description regarding the process 1100 is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. In some embodiments, one or more operations may be added to or omitted from the process 1100. In some embodiments, an operation of the process 1100 may be divided into two or more sub-operations.

FIG. 12 is a flowchart illustrating an exemplary process for material decomposition according to some embodiments of the present disclosure. In some embodiments, the process 1200 may be implemented as a set of instructions (e.g., an application) stored in a storage device (e.g., the storage device 150, the storage device 220, and/or the storage 390). The processing device 140 (e.g., the processor 210, the CPU 340, and/or one or more modules illustrated in FIG. 4) may execute the set of instructions, and when executing the instructions, the processing device 140 may be configured to perform the process 1200. The operations of the illustrated process presented below are intended to be illustrative. In some embodiments, the process 1200 may be accomplished with one or more additional operations not described and/or without one or more of the operations discussed. Additionally, the order of the operations of process 1200 illustrated in FIG. 12 and described below is not intended to be limiting. In some embodiments, the process 500 may be achieved by operations of the process 1200.

In 1201, the processing device 140 (e.g., the obtaining module 410) may obtain scan projection data of the target object, which is the same as or similar to the operation 503.

In 1203, the processing device 140 (e.g., the parameter determination module 420) may obtain a plurality of sets of combined projection data of at least two reference materials (e.g., a first reference material and a second reference material) with a plurality of thickness combinations.

In some embodiments, the at least two reference materials may be determined based on the target object. For example, the at least two reference materials may correspond to at least two target materials of the target object. The at least two reference materials and the at least two target materials may have equivalent or substantially consistent attenuation characteristics. In some embodiments, the at least two reference materials may include material flat plates, and the material flat plates may be positioned such that a normal vector of each of the material flat plates has a consistent direction with an isocentric ray of a radiation source of a scanner that is used to acquire the projection data of the at least two materials. More descriptions regarding the at least two reference materials and the projection data thereof may be found elsewhere in the present disclosure (e.g., operations 503 and 601 and the relevant descriptions thereof).

In 1205, the processing device 140 (e.g., the parameter determination module 420) may obtain a density of each of the at least two reference materials (e.g., a first density of the first reference material and a second density of the second reference material), which is similar to the operation 603 and the relevant description thereof.

In 1207, the processing device 140 (e.g., the parameter determination module 420) may determine a plurality of sets of corrected combined projection data of the at least two reference materials by performing a correction operation on the plurality of sets of combined projection data of the at least two reference materials.

In some embodiments, the correction operation may include a cosine correction, an air correction in log domain, or the like, or any combination thereof. More descriptions of the correction operation may be found elsewhere in the present disclosure (e.g., FIG. 10 and the relevant description thereof).

In 1209, the processing device 140 (e.g., the parameter determination module 420) may determine actual pixel parameters and reference pixel parameters of a preset model based on the corrected projection data of the at least two reference materials, the plurality of thickness combinations, the density of each of the at least reference materials, and the preset model.

In some embodiments, the processing device 140 may determine the actual pixel parameters by inputting the corrected projection data of the at least two reference materials with the plurality of thickness combination, the plurality of thickness combinations, and the density of each of the at least reference materials into the preset model (e.g., expressed as formulas (1) and (2)) to perform a processing (e.g., a mathematic processing). More descriptions regarding the determination of the actual pixel parameters may be found elsewhere in the present disclosure (e.g., operation 503 in FIG. 5, FIG. 6, and relevant descriptions thereof).

In some embodiments, the processing device 140 may determine a plurality of sets of mean projection data by performing a mean operation on the plurality of corrected combined projection data. The processing device 140 may determine the reference pixel parameters by inputting the plurality of sets of mean projection data, the plurality of thickness combinations, the density of each of the at least reference materials into the preset model (e.g., as expressed as formulas (3) and (4)). More descriptions regarding the determination of the reference pixel parameters may be found elsewhere in the present disclosure (e.g., operation 603 in FIG. 6, FIG. 8, and relevant descriptions thereof).

In 12011, the processing device 140 (e.g., the correction module 430) may determine density path integrals of the at least two target materials by inputting the actual pixel parameters and the scan projection data of the target object to the preset model (e.g., expressed as formulas (1) and (2)), which is the same as or similar to the operation 901 in FIG. 9.

In 1213, the processing device 140 (e.g., the correction module 430) may determine corrected projection data of the target object by inputting the reference pixel parameters and the density path integrals of the at least two target materials to the preset model, which is the same as or similar to the operation 903 in FIG. 9.

In 1215, the processing device 140 (e.g., the correction module 430) may determine a reconstructed image by performing, based on the corrected projection data, image reconstruction, which is the same as or similar to the operation 505 in FIG. 5.

In 1217, the processing device 140 (e.g., the material decomposition module 440) may determine density distribution images of at least two target materials of the target object by decomposing the reconstructed image, which is the same as or similar to operation 507 in FIG. 5.

In some embodiments, the reconstructed image may include a first reconstructed image corresponding to a high energy spectrum and a second reconstructed image corresponding to a low energy spectrum. The processing device 140 may decompose the reconstructed image based on a $\mu$ value-based decomposition algorithm, e.g., according to formula (5) as follows:

$$\begin{pmatrix} x_{1p} \\ x_{2p} \end{pmatrix} = \frac{1}{\mu_{1H}\mu_{2L} - \mu_{2H}\mu_{1L}} \begin{pmatrix} \mu_{2L} & -\mu_{2H} \\ -\mu_{1L} & \mu_{1H} \end{pmatrix} \begin{pmatrix} \mu_{Hp} \\ \mu_{Lp} \end{pmatrix}, \qquad (5)$$

where H and L denotes a first (e.g., high) energy spectrum and a second (e.g., low energy) spectrum, 1 denotes a first target material, 2 denotes a second target material, p denotes a $p^{th}$ pixel, $x_{1p}$ denotes the $p^{th}$ pixel in a density distribution image of the first target image, $x_{1p}$ denotes the $p^{th}$ pixel in a density distribution image of the second target image, $\mu_{1L}$ denotes an attenuation coefficient of target material 1 under the energy spectrum L, $\mu_{1H}$ denotes an attenuation coefficient of target material 1 under the energy spectrum H, $\mu_{2L}$ denotes an attenuation coefficient of target material 2 under the energy spectrum L, $\mu_{2H}$ denotes an attenuation coefficient of target material 2 under the energy spectrum H, $\mu_{Hp}$ denotes the $p^{th}$ pixel in a first reconstructed image corresponding to the energy spectrum H, and $\mu_{Lp}$ denotes the $p^{th}$ pixel in the second reconstructed image corresponding to the energy spectrum L.

In some embodiments, the at least two target materials may include water and iodine. The processing device 140 may decompose the reconstructed image based on a Kalender's correlated noise reduction(KCNR) algorithm, e.g., according to formulas (6) and (7) as follows:

$$\text{Water}^{KCNR} = \text{Water} + \text{coeff } 1 * \text{Iodine}_{HPF}, \quad (6)$$

$$\text{Iodine}^{KCNR} = \text{Iodine} + \text{coeff } 2 * \text{Water}_{HPF}, \quad (7)$$

where HPF denotes high-frequency components, $\text{Water}^{KCNR}$ denotes a corrected image of deposed water using the KCNR algorithm, Water denotes an image of deposed water using the $\mu$ value-based decomposition algorithm or the CT value-based decomposition algorithm, coeff 1 denotes an adjustable parameter associated with water, $\text{Iodine}_{HPF}$ denotes high-frequency components of Iodine, $\text{Iodine}^{KCNR}$ denotes a corrected image of deposed iodine using the KCNR algorithm, Iodine denotes an image of deposed iodine using the $\mu$ value-based decomposition algorithm or the CT value-based decomposition algorithm, coeff 2 denotes an adjustable parameter associated with iodine, $\text{Water}_{HPF}$ denotes high-frequency components of water, and $\text{Iodine}_{HPF}$ denotes high-frequency components of iodine. In some embodiments, the high-frequency components may be determined according to multiple filtering algorithms such as a Gaussian filtering algorithm or an adaptive filtering algorithm.

It should be noted that the above description regarding the process 1200 is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. In some embodiments, one or more operations may be added to or omitted from the process 1200. For example, operations 1203-1209 may be omitted, and the processing device 140 may directly obtain the actual pixel parameters and the reference pixel parameters of the present model for subsequent processing. In some embodiments, an operation of the process 1200 may be divided into two or more sub-operations.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "unit," "module," or "system." Furthermore, aspects of the present disclosure may take the form of a computer program product embodied in one or more computer-readable media having computer-readable program code embodied thereon.

A non-transitory computer-readable signal medium may include a propagated data signal with computer readable program code embodied therein, for example, in baseband or as part of a carrier wave. Such a propagated signal may take any of a variety of forms, including electromagnetic, optical, or the like, or any suitable combination thereof. A computer-readable signal medium may be any computer-readable medium that is not a computer-readable storage medium and that may communicate, propagate, or transport a program for use by or in connection with an instruction execution system, apparatus, or device. Program code embodied on a computer-readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object-oriented programming language such as Java, Scala, Smalltalk, Eiffel, JADE, Emerald, C++, C#, VB. NET, Python or the like, conventional procedural programming languages, such as the "C" programming language, Visual Basic, Fortran, Perl, COBOL, PHP, ABAP, dynamic programming languages such as Python, Ruby, and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations, therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software-only solution, e.g., an installation on an existing server or mobile device.

Similarly, it should be appreciated that in the foregoing description of embodiments of the present disclosure, various features are sometimes grouped together in a single embodiment, figure, or description thereof to streamline the disclosure aiding in the understanding of one or more of the various inventive embodiments. This method of disclosure, however, is not to be interpreted as reflecting an intention that the claimed object matter requires more features than are expressly recited in each claim. Rather, inventive embodiments lie in less than all features of a single foregoing disclosed embodiment.

In some embodiments, the numbers expressing quantities, properties, and so forth, used to describe and claim certain embodiments of the application are to be understood as being modified in some instances by the term "about," "approximate," or "substantially." For example, "about," "approximate" or "substantially" may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the application are approximations, the numerical values set forth in the specific examples are reported as precisely as practicable.

Each of the patents, patent applications, publications of patent applications, and other material, such as articles, books, specifications, publications, documents, things, and/or the like, referenced herein is hereby incorporated herein by this reference in its entirety for all purposes, excepting any prosecution file history associated with same, any of same that is inconsistent with or in conflict with the present document, or any of same that may have a limiting effect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the present application are not limited to that precisely as shown and described.

We claim:

1. A system, comprising:
a storage device storing a set of instructions; and
at least one processor in communication with the storage device, wherein when executing the set of instructions, the at least one processor is configured to cause the system to:
obtain scan projection data of a target object;
determine corrected projection data by correcting, based on one or more pixel parameters, the scan projection data, wherein the one or more pixel parameters are determined by performing a model calibration on at least two reference materials, the at least two reference materials are configured as material flat plates, and the material flat plates are positioned such that a normal vector of each of the material flat plates has a consistent direction with an isocentric ray of a radiation source;
determine a reconstructed image by performing, based on the corrected projection data, image reconstruction; and
determine density distribution images of at least two target materials of the target object by decomposing the reconstructed image, the at least two reference materials corresponding to the at least two target materials.

2. The system of claim 1, wherein each of the at least two reference materials and a corresponding one of the at least two target materials have substantially consistent attenuation characteristics.

3. The system of claim 1, wherein the model calibration includes determining actual pixel parameters and reference pixel parameters of a preset model based on projection data of the at least two reference materials and the preset model.

4. The system of claim 3, wherein the projection data of the at least two reference materials includes a plurality of sets of combined projection data of the at least two reference materials with a plurality of thickness combinations, and to determine the actual pixel parameters and the reference pixel parameters of the preset model based on the projection data of the at least two reference materials and the preset model, the at least one processor is configured to cause the system to:
obtain a density of each of the at least two reference materials; and
determine the actual pixel parameters and the reference pixel parameters by processing initial pixel parameters of the preset model based on the plurality of sets of combined projection data, the plurality of thickness combinations of the at least two reference materials, and the densities of the at least two reference materials.

5. The system of claim 4, wherein to determine the reference pixel parameters, the at least one processor is configured to cause the system to:
determine a set of mean projection data by performing a mean operation on each set of the plurality of sets of combined projection data, to obtain a plurality of sets of mean projection data;
determine the reference parameters of the preset model by inputting the plurality of sets of mean projection data, the plurality of thickness combinations of the at least two reference materials, and the densities of the at least two reference materials to the preset model to perform the processing.

6. The system of claim 4, wherein the at least one processor is further configured to cause the system to:

determine a set of corrected combined projection data by performing a correction operation on each set of the plurality of sets of combined projection data of the at least two reference materials with one of the plurality of thickness combinations.

7. The system of claim 6, wherein the correction operation includes a cosine correction.

8. The system of claim 3, wherein the preset model is configured to represent a correlation relationship between projected data of the at least two reference materials, the actual pixel parameters and the reference pixel parameters, and the at least two reference materials.

9. The system of claim 1, wherein the one or more pixel parameters include actual pixel parameters and reference pixel parameters of a preset model, and to determine the corrected projection data, the at least one processor is configured to cause the system to:

determine density path integrals of the at least two target materials by inputting the actual pixel parameters and the scan projection data to the preset model; and determine the corrected projection data by inputting the reference pixel parameters and the density path integrals of the at least two target materials to the preset model.

10. A system, comprising:

a storage device storing a set of instructions; and at least one processor in communication with the storage device, wherein when executing the set of instructions, the at least one processor is configured to cause the system to:

obtain projection data of at least two reference materials; and determine, based at least on the projection data of the at least two reference materials, one or more pixel parameters of a preset model for correcting scan projection data of a target object, wherein:

the preset model represents a correlation relationship between the projected data of the at least two reference materials, the one or more pixel parameters, and the at least two reference materials, the at least two reference materials are configured as material flat plates, the material flat plates being positioned such that a normal vector of each of the material flat plates has a consistent direction with an isocentric ray of a radiation source, and the target object includes at least two target materials corresponding to the at least two reference materials.

11. The system of claim 10, wherein the one or more pixel parameters include actual pixel parameters and reference pixel parameters of the preset model.

12. The system of claim 11, wherein the projection data of the at least two reference materials includes a plurality of sets of combined projection data of the at least two reference materials with a plurality of thickness combinations, and to determine, based at least on the projection data of the at least two reference materials, one or more pixel parameters of a preset model for correcting scan projection data of a target object, the at least one processor is configured to cause the system to:

obtain a density of each of the at least two reference materials; and determine the actual pixel parameters and the reference pixel parameters by processing initial pixel parameters of the preset model based on the plurality of sets of combined projection data, the plurality of thickness combinations of the at least two reference materials, and the densities of the at least two reference materials.

13. The system of claim 12, wherein to determine the reference pixel parameters, the at least one processor is configured to cause the system to:

determine a set of mean projection data by performing a mean operation on each set of the plurality of sets of combined projection data, to obtain a plurality of sets of mean projection data;

determine the reference parameters of the preset model by inputting the plurality of sets of mean projection data, the plurality of thickness combinations of the at least two reference materials, and the densities of the at least two reference materials to the preset model to perform the processing.

14. The system of claim 12, wherein the at least one processor is configured to cause the system to:

determine a set of corrected combined projection data by performing a correction operation on each set of the plurality of sets of combined projection data of the at least two reference materials with one of the plurality of thickness combinations.

15. The system of claim 10, wherein each of the at least two reference materials and a corresponding one of the at least two target materials have substantially consistent attenuation characteristics.

16. A method, implemented on a computing device, the method including:

obtaining scan projection data of a target object;

determining corrected projection data by correcting, based on one or more pixel parameters, the scan projection data, wherein the one or more pixel parameters are determined by performing a model calibration on at least two reference materials, the at least two reference materials are configured as material flat plates, and the material flat plates are positioned such that a normal vector of each of the material flat plates has a consistent direction with an isocentric ray of a radiation source;

determining a reconstructed image by performing, based on the corrected projection data, image reconstruction; and determining density distribution images of at least two target materials of the target object by decomposing the reconstructed image, the at least two reference materials corresponding to the at least two target materials.

17. The system of claim 1, wherein the model calibration is pre-performed and the one or more pixel parameters are stored in advance.

18. The method of claim 16, wherein the model calibration includes determining actual pixel parameters and reference pixel parameters of a preset model based on projection data of the at least two reference materials and the preset model.

19. The method of claim 18, wherein the projection data of the at least two reference materials includes a plurality of sets of combined projection data of the at least two reference materials with a plurality of thickness combinations, and the determining the actual pixel parameters and the reference pixel parameters of the preset model based on the projection data of the at least two reference materials and the preset model comprises:

obtaining a density of each of the at least two reference materials; and determining the actual pixel parameters and the reference pixel parameters by processing initial pixel parameters of the preset model based on the plurality of sets of combined projection data, the plurality of thickness combinations of the at least two reference materials, and the densities of the at least two reference materials.

20. The method of claim 16, wherein the one or more pixel parameters include actual pixel parameters and reference pixel parameters of a preset model, and the determining the corrected projection data comprises:

determining density path integrals of the at least two target materials by inputting the actual pixel parameters and the scan projection data to the preset model; and determining the corrected projection data by inputting the reference pixel parameters and the density path integrals of the at least two target materials to the preset model.

* * * * *